United States Patent
Kumta et al.

(10) Patent No.: US 12,218,310 B2
(45) Date of Patent: Feb. 4, 2025

(54) WEAVABLE, CONFORMABLE, WEARABLE AND FLEXIBLE COMPONENTS FOR ADVANCED BATTERY TECHNOLOGY

(71) Applicant: UNIVERSITY OF PITTSBURGH—OF THE COMMONWEALTH SYSTEM OF HIGHER EDUCATION, Pittsburgh, PA (US)

(72) Inventors: Prashant N. Kumta, Pittsburgh, PA (US); Moni K. Datta, Pittsburgh, PA (US); Prashanth Jampani Hanumantha, Pittsburgh, PA (US); Bharat Gattu, Pittsburgh, PA (US); Pavithra Murugavel Shanthi, Pittsburgh, PA (US)

(73) Assignee: UNIVERSITY OF PITTSBURGH—OF THE COMMONWEALTH SYSTEM OF HIGHER EDUCATION, Pittsburgh, PA (US)

( * ) Notice: Subject to any disclaimer, the term of this patent is extended or adjusted under 35 U.S.C. 154(b) by 593 days.

(21) Appl. No.: 16/647,050

(22) PCT Filed: Sep. 17, 2018

(86) PCT No.: PCT/US2018/051319
§ 371 (c)(1),
(2) Date: Mar. 13, 2020

(87) PCT Pub. No.: WO2019/055906
PCT Pub. Date: Mar. 21, 2019

(65) Prior Publication Data
US 2020/0274201 A1    Aug. 27, 2020

Related U.S. Application Data

(60) Provisional application No. 62/559,012, filed on Sep. 15, 2017.

(51) Int. Cl.
*H01M 10/0585*    (2010.01)
*D01D 5/00*    (2006.01)
(Continued)

(52) U.S. Cl.
CPC ...... *H01M 10/0585* (2013.01); *D01D 5/0007* (2013.01); *D03D 1/0088* (2013.01);
(Continued)

(58) Field of Classification Search
None
See application file for complete search history.

(56) References Cited

U.S. PATENT DOCUMENTS

| | | | |
|---|---|---|---|
| 8,192,863 | B2 | 6/2012 | Best et al. |
| 2009/0169996 | A1 | 7/2009 | Zhamu et al. |

(Continued)

FOREIGN PATENT DOCUMENTS

| KR | 1020170084912 | * | 7/2017 | .......... H01M 10/056 |
|---|---|---|---|---|

OTHER PUBLICATIONS

H. Xie et al., Investigation on polyethylene-supported and nano-SiO2 doped poly(methyl methacrylate-co-butyl acrylate) based gel polymer electrolyte for high voltage lithium ion battery, Electrochimica Acta, vol. 127, 2014, pp. 327-333 (Year: 2014).*

(Continued)

*Primary Examiner* — Lucas J. O'Donnell
(74) *Attorney, Agent, or Firm* — Carol A. Marmo; Eckert Seamans Cherin & Mellott, LLC

(57) ABSTRACT

The invention, relates to flexible, thin trim batteries for use in a variety of applications including, but not limited to, flexible electronics, flexible energy storage systems, wearable textile-like energy devices and various other integrated electronic and mobile device-based applications. The flexible, thin, film batteries allow the design and development of weavable, conformable, wearable and flexible components (Continued)

for advanced battery technology. The invention relates to flexible energy storage system that include an electrospun, textile-like, weaved assembly including a flexible cathode, a flexible anode, and an electrolyte. The electrolyte can include a flexible gel-polymer and a nanostractured filler.

18 Claims, 17 Drawing Sheets

(51) Int. Cl.
    *D03D 1/00*     (2006.01)
    *H01M 4/36*     (2006.01)
    *H01M 4/38*     (2006.01)
    *H01M 10/04*     (2006.01)
    *H01M 10/0525*     (2010.01)
    *H01M 10/0565*     (2010.01)
    *H01M 4/02*     (2006.01)

(52) U.S. Cl.
    CPC ........... *H01M 4/364* (2013.01); *H01M 4/386* (2013.01); *H01M 10/0436* (2013.01); *H01M 10/0525* (2013.01); *H01M 10/0565* (2013.01); *D10B 2401/18* (2013.01); *H01M 2004/022* (2013.01); *H01M 2220/30* (2013.01); *H01M 2300/0085* (2013.01)

(56) References Cited

U.S. PATENT DOCUMENTS

| | | | |
|---|---|---|---|
| 2009/0311587 A1* | 12/2009 | Best | H01M 50/105 |
| | | | 429/127 |
| 2012/0052397 A1* | 3/2012 | Mikhaylik | H01M 50/46 |
| | | | 429/231.95 |
| 2012/0094213 A1 | 4/2012 | Ha et al. | |
| 2015/0325882 A1* | 11/2015 | Yushin | H01M 10/058 |
| | | | 429/188 |
| 2016/0036037 A1* | 2/2016 | Rhodes | H01M 4/0483 |
| | | | 429/231.95 |
| 2016/0294000 A1 | 10/2016 | He et al. | |
| 2017/0250442 A1 | 8/2017 | Maranas et al. | |
| 2018/0090751 A1* | 3/2018 | Xu | H01M 4/13 |

OTHER PUBLICATIONS

N. Zebardastan et al., Novel poly(vinylidene fluoride-co-hexafluoro propylene)/polyethylene oxide based gel polymer electrolyte containing fumed silica (SiO2) nanofiller for high performance dye-sensitized solar cell, Electrochimica Acta, vol. 220, 2016, pp. 573-580 (Year: 2016).*
KR20170084912 English translation (Year: 2017).*
Jae-Kwang Kim, Hybrid gel polymer electrolyte for high-safety lithium-sulfur batteries, Materials Letters, vol. 187, 2017, pp. 40-43 (Year: 2017).*
J.K. Kim, G. Cheruvally, X. Li, J.H. Ahn, K.W. Kim, H.J. Ahn; J. Power Sour., 178 (2008), pp. 815-820 (Year: 2008).*

* cited by examiner

WEAVABLE, CONFORMABLE, WEARABLE AND FLEXIBLE COMPONENTS FOR ADVANCED BATTERY TECHNOLOGY

CROSS-REFERENCE TO RELATED APPLICATIONS

This application is a U.S. National Stage Application under 35 U.S.C. § 371 of International Patent Application No. PCT/US2018/051319, filed on Sep. 17, 2018, entitled "WEAVABLE, CONFORMABLE, WEARABLE AND FLEXIBLE COMPONENTS FOR ADVANCED BATTERY TECHNOLOGY", which claims priority under 35 U.S.C. § 119 (e) to U.S. Provisional Patent Application Ser. No. 62/559,012, filed Sep. 15, 2017, entitled "ELECTROSPINNING OF PVDF-HFP, NOVEL COMPOSITE POLYMER ELECTROLYTES (CPES) WITH ENHANCED IONIC CONDUCTIVITIES FOR RECHARGEABLE LITHIUM-SULFUR BATTERIES", which are herein incorporated by reference.

GOVERNMENT SUPPORT

This invention was made with government support under DE-EE0006825 awarded by the Department of Energy. The government has certain rights in the invention.

FIELD

The invention relates to weavable, conformable, wearable and flexible components for advanced battery technology and, more particularly, to flexible electronics, flexible energy storage systems and wearable textile-like energy devices, as well as flexible thin film batteries used in the components.

BACKGROUND

During the last two decades, there has been unprecedented development in lithium-ion battery technology due to the increased demand for ever-increasing portable electronic devices and hybrid electric vehicles. Portable electronic devices, mobile cellular phones and person digital assistants (PDAs) use secondary lithium-ion batteries (LIBs), which are not economical for large scale plug-in hybrid applications. In addition, there is increased concern associated with the safety of LIBs that has drawn the attention of researchers towards the development of high energy density, leak-free and flexible lithium polymer batteries with improved safety.

Though the field of LIBs has made tremendous progress, transition metal oxide and phosphate-based cathodes typically used in these systems have maintained a maximum theoretical capacity of ~200-300 mAh/g. This energy limitation, along with high cost and ecological concerns associated with these materials continues to restrict their application in large-scale devices.

Lithium-sulfur (Li—S) battery technology has been considered and investigated as an alternative for current LIBs due to the superior theoretical capacity (1674 mAh/g), and specific energy density (2600 Wh/kg) of elemental sulfur in comparison with conventional cathode materials. In addition, the low cost, abundance, and environmentally friendly property of sulfur makes it a promising candidate as cathode material for large scale energy storage applications. However, lithium-sulfur batteries suffer from inefficient utilization of the active material due to the insulating nature of elemental sulfur. The lithium polysulfides formed during the electrochemical cycling of sulfur are also highly soluble in organic liquid electrolytes leading to loss of active material which in turn results in poor cyclability and utilization.

Improved active material utilization can be achieved by embedding the sulfur into a conducting carbonaceous or polymeric matrix forming composites. This technique provides a conducting network for sulfur, hence improving the conductivity of the composite. Other approaches to improve the capacity of Li—S batteries involve the use of chemical interactions of polysulfides with transition metal oxides and trapping of sulfur into porous structures to prevent them from dissolving into the electrolyte. Though these approaches can increase the active material utilization of sulfur cathodes, they do not completely prevent the polysulfide from dissolving into the electrolyte.

Another approach to reduce the dissolution of sulfur is to modify the electrolyte by replacing it with an ionic liquid electrolyte or a polymer electrolyte. Among these approaches to modify the electrolyte, replacing liquid organic liquid electrolytes with polymeric electrolytes is also promising and proven to be effective. In general, a polymeric electrolyte may be defined as a membrane with transport properties like that of liquid ionic electrolytes. Polymer electrolytes, originally developed for lithium ion battery system, may be modified for application in lithium sulfur batteries. All the polymer systems can be conveniently grouped into two broad categories comprising essentially solid polymer electrolyte (SPE) and gel polymer electrolyte (GPE).

Solid polymer electrolytes (SPEs) are composed of a lithium salt (e.g., $LiPF_6$, $LiCF_3SO_3$, and $LiC(CF_3SO_2)_3$) dissolved in high molecular weight polymers such as polyethylene oxide (PEO) or polypropylene oxide (PPO), with the polymer acting as a solid solvent. SPEs conduct ions through local segment motion of polymer resulting in poor ionic conductivities. The second class of polymer electrolyte, GPE is obtained by incorporating liquid electrolyte into a polymer matrix that forms a stable gel polymeric host, resulting in high ionic conductivities. The advantages of GPE over liquid electrolyte include no internal short-circuiting and electrolyte leakage. The prerequisites of GPEs for lithium-sulfur batteries includes high ionic conductivity at ambient and non-ambient temperatures, high transference number, good mechanical strength, thermal and electrochemical stability and compatibility with electrodes, in addition to their ability to act as a physical barrier that prevents the dissolution of polysulfide ions from the cathode and subsequent deposition at the anode.

Electrospinning is an efficient fabrication process that yields porous and fibrous membranes with average diameters ranging from 100 nm to 5 μm, which are at least one or two orders of magnitude smaller than the fibers produced from other fiber fabrication processes, such as melt and solution spinning. Electrospinning technology has recently been extended to various fields such as preparation of porous filters, biomedical materials, reinforcing components, cloths for electromagnetic wave shielding, sensors, electronic devices, etc. Electrospun mats of conventional polymer composites have been used as electrolytes for lithium-ion batteries. These electrospun polymer electrolytes show superior mechanical and ionic properties due to their unique fibrous structure. However, the use of electrospun polymer membranes as electrolytes for lithium sulfur batteries is not known in the art.

There is a need in the art for weavable, conformable, wearable and flexible components for advanced battery technology, for example, flexible energy storage systems that incorporate flexible components, such as, a flexible cathode system, a flexible anode system and a flexible gel-polymer electrolyte (GPE) material, as well as methods capable of generating these systems.

SUMMARY

In one aspect, the invention provides a flexible energy storage system that includes an electrospun, textile-like, weaved assembly, which includes a flexible cathode, a flexible anode, and an electrolyte that includes a flexible gel-polymer and a nanostructured filler.

Each of the cathode, anode and electrolyte can be in the form of an electrospun yarn.

In certain embodiments, the electrospun, textile-like, weaved assembly includes an anode current collector, an anode active material, the electrolyte having a layered configuration, comprising a doped oxide and/or a doped non-oxide filler, a cathode active material, and a cathode current collector.

The system may also include a polymer shell to encompass the electrospun, textile-like, weaved assembly.

The flexible anode can include undoped and/or doped amorphous and/or crystalline/nanocrystalline silicon fibers, and may be in the form of a mat. The doped silicon fibers may include a dopant selected from any element other than Group IV of the Periodic Table. The flexible cathode can include undoped and/or doped sulfur wires and may be in the form of a mat. The doped sulfur wires can include a dopant selected from any element other than oxygen from Group VI of the Periodic Table.

In another aspect, the invention provides a flexible battery device that includes a stacked configuration, which includes a flexible anode; a flexible cathode; and a flexible lithium ion conducting membrane comprising a gel-polymer electrolyte, wherein the lithium ion conducting membrane is positioned between the flexible anode and flexible cathode.

In yet another aspect, the invention provides a method of preparing a flexible energy storage system. The method includes electrospinning a material comprising silicon fibers to form a flexible anode; electrospinning a material comprising sulfur wires to form a flexible cathode; electrospinning a polymer-gel to form a flexible electrolyte; and assembling the anode, cathode and electrolyte to form a textile-like, weaved assembly.

Each of the flexible anode, cathode and electrolyte can form a separate mat or sheet. Each separate mat or sheet includes textile-like yarn.

In still another aspect, the invention provides a textile-like fabric having integrated therein the foregoing flexible energy storage system.

BRIEF DESCRIPTION OF DRAWINGS

A full understanding of the disclosed concept can be gained from the following description of the preferred embodiments when read in conjunction with the accompanying drawings.

DETAILED DESCRIPTION OF THE INVENTION

Figure 1:
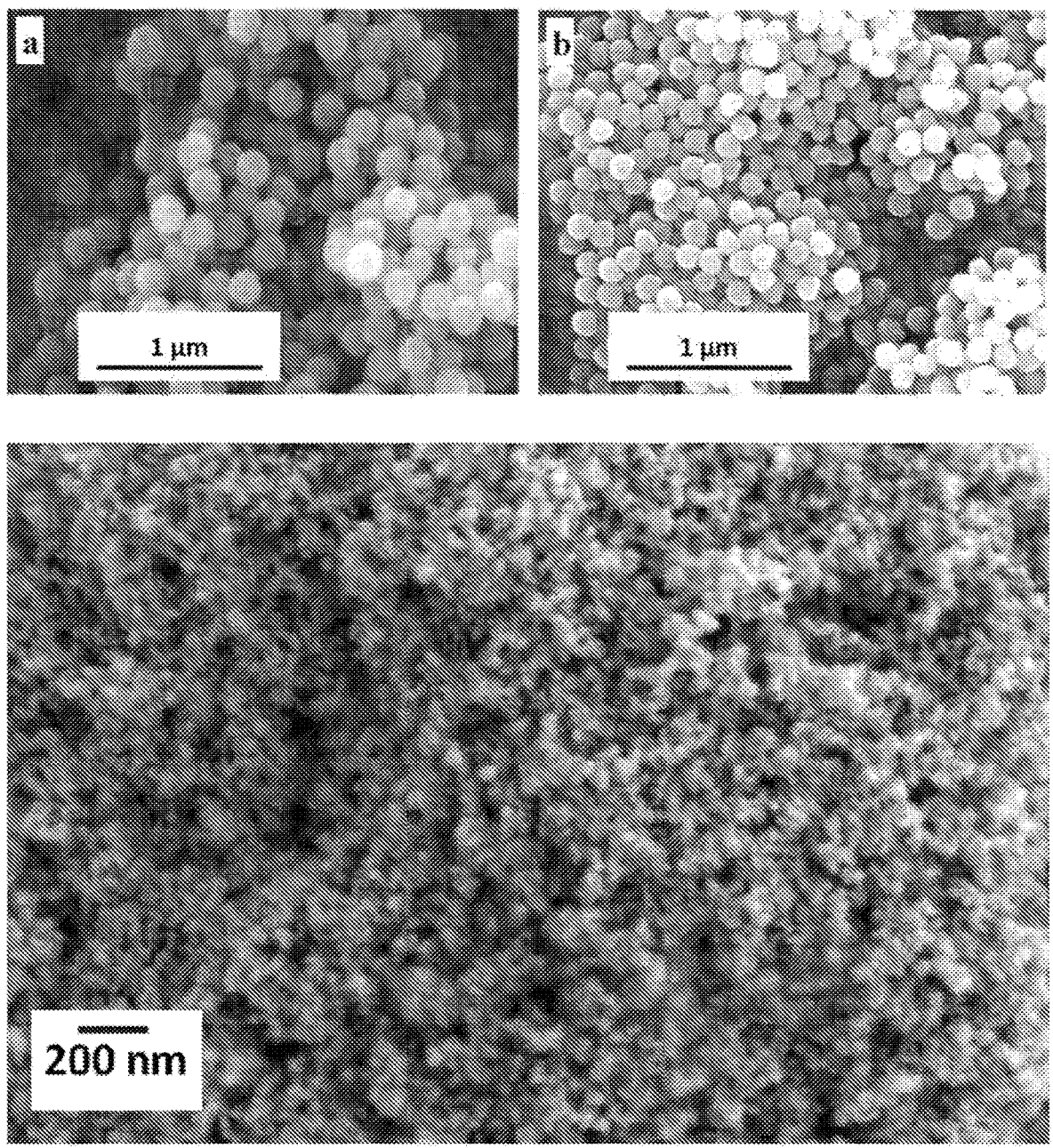
FIG. 1 includes SEM images showing the morphology of nm-$SiO_2$ and nm-$TiO_2$ and c) f-$SiO_2$, in accordance with certain embodiments of the invention.

The invention relates to flexible, thin film batteries for use in a variety of applications including, but not limited to, flexible electronics, flexible energy storage systems, wearable textile-like energy devices and various other integrated electronic and mobile device-based applications. The flexible, thin film batteries allow the design and development of weavable, conformable, wearable and flexible components for advanced battery technology. The present invention provides flexible energy storage systems that are suitable for such applications.

The present invention includes multiple separate components, and methods for their preparation and/or generation. The multiple separate components include:
  (i) a flexible cathode system consisting of sulfur active material and composites;
  (ii) a flexible anode system consisting of silicon active material;
  (iii) a flexible gel-polymer electrolyte material consisting of layered materials with a doped or undoped system as a filler material;
  (iv) an electrospinning method capable of generating the three systems as standalone sheets, which are assembled to create a flexible battery device;
  (v) an electrospinning method capable of generating the aforementioned materials as standalone spinnable devices consisting of the following (stacked) layers: anode current collector, anode active material, electrolyte, cathode active material, cathode current collector and polymer battery shell; and
  (vi) a textile-like weaving method capable of stitching together the various electrode yarns and the battery device yarn into textile-type morphologies and various other flexible configurations.

In certain embodiments, the invention includes the following: a flexible silicon anode mat consisting of thin silicon fibers, e.g., from about 200 to about 400 nm, including, for example, from about 45 to about 80 percent by weight of silicon, wherein the thickness may be from about 300 to about 500 microns; a textile mat-like morphology consisting of layers of ionically conducting gel-polymers, wherein the fiber diameter may be from about 1 to about 7 µm, and the mat thickness may be from about 100 to about 500 microns; and a flexible sulfur cathode mat consisting of sulfur wires, which may have a fiber diameter from about 1 to about 7 µm, and may consist of about 20 to about 50 percent by weight sulfur with a thickness, for example, from about 1 to about 6 microns.

Electrospinning methodology is used for preparing high performance electrodes and battery devices that can be woven into a fabric with applications in small-scale mobile and energy storage devices in a textile form. The electrospun fibers have a yarn-like quality, such that they can be woven into a fabric for a variety of applications. The electrode and battery device configurations of the invention possess high electronic conductivity, minimal volumetric expansion, improved rate capabilities and superior cycling ability.

The flexible cathode system for use in the invention includes a composite of electro-spun fibers, such as, electro-spun sulfur wires or yarns, which can have diameters of a few nanometers to several micrometers and, lengths as short as a few inches to as long as several feet. In certain embodiments, the diameter can be from greater than about 100 nanometers to about 10 µm and, the length can be from about 12 inches to about 24 inches. The fibers can have a surface that exhibits a smooth or irregular surface topography depending on the nature of the bias and the viscosity of the spinning solution. The fibers, e.g., wires or yarns, can be used in preparing sulfur cathodes. The unique fiber morphology, derived by the electrospinning methods having the capability of generating the flexible sulfur wires or yarns, provides an opportunity for small-scale mobile device applications, such as, textile batteries. Coating the electrodes with an inorganic Li ion conductor results in further improvement of cycling behavior, including stable capacity and low fade rate.

Electrospun fibers have a pliable morphology and, can be handled and synthesized with ease. The wires are capable of being spun into a yarn and woven directly into cathodes for textile batteries. The sulfur-polymer fibers, e.g., wires or yarns, are composed of a sulfur component and a polymer component, e.g., precursors. In certain embodiments, sulfur and polymer components are co-dissolved in solvent to form a unique electro-spinnable solution, and then the solution is electro-spun into the wires or yarns. The sulfur component can be selected from a wide variety of active sulfur compounds known in the art, such as, but not limited to, sulfur powder, nano-sulfur powder, and mixtures thereof. The polymer component can be selected from a wide variety of known polymers. Non-limiting examples of suitable polymers include known conducting polymers, such as, but not limited to, polystyrene such as polyaniline, polythiophene, polypyrrole, polyacrylamide, polyvinylidene fluoride, and others selected from a family of nitriles, amines, amides, and ethers, with functional groups selected from oxygen, fluorine, sulfur, selenium, tellurium, phosphorus and nitrogen, and mixtures thereof. Optionally, graphene can be included in the polymer component. Thus, in certain embodiments, the polymer is a mixture of polymer and graphene. In other embodiments, the polymer is a combination or mixture of polystyrene and graphene, as well as a mixture of other polymers as disclosed above with graphene including carbon nanotubes. In these embodiments, the polymer serves as an electron conducting filler, as well as a current collector, e.g., an embedded current collector. The solvent can be selected from known solvents, such as, but not limited to, carbon disulfide.

The flexible cathode can include undoped and/or doped sulfur wires. The doped sulfur wires can include a dopant selected from any element other than oxygen from Group VI of the Periodic Table.

The sulfur fibers may be formed, e.g., pressed, into a flexible pellet electrode. The flexible pellet electrode may be used as a stand-alone cathode for textile batteries with or without the application of a lithium ion conducting coating. The electro-spun sulfur fibers can be interconnected to form a web or mat. As mentioned, the diameters of the fibers can vary and in certain embodiments, can be from about 10 nanometers to about 100 microns. In certain embodiments, the electro-spun sulfur fibers, e.g., wires or yarns, are from about 1 to about 7 µm. The individual fibers in the matte, e.g., nonwoven matte, can have a random orientation or can be predominantly oriented in one or more directions.

In accordance with the electro-spinning methods, the resulting electro-spun sulfur fibers, e.g., wires or yarns, have a unique morphology amenable for flexible battery applications. The fibers can include a composite configuration having a textile-matte-like morphology consisting of layers of sulfur wires and conducting polymer. The textile-like matte can include a layer of sulfur wires deposited on a current collector and additional layers of sulfur wires separated by conducting polymer deposited thereon, e.g., alternating layers of sulfur wires and conducting polymer are deposited, layer-by-layer, onto the current collector. In certain embodiments, an aluminum current collector is used.

The flexible anode system for use in the invention may include a composite of electro-spun fibers, such as, electro-spun silicon fibers. The fibers can have a surface that exhibits a smooth or irregular surface topography depending on the nature of the bias and the viscosity of the spinning solution. The fibers are used in preparing silicon anodes. The unique fiber morphology, derived by the electro-spinning methods having the capability of generating the flexible silicon fibers, provides an opportunity for small-scale mobile device applications, such as, textile batteries.

Electrospun fibers have a pliable morphology and, can be handled and synthesized with ease. The fibers are capable of being woven directly into anodes for textile batteries. The silicon polymer fibers are composed of a silicon component and a polymer component, e.g., precursors. In certain embodiments, silicon nanoparticles and polymer are dissolved, e.g., co-dissolved, in solvent to form a unique electro-spinnable solution, and then the solution is electro-spun into the fibers. The silicon component can be selected from a wide variety of active silicon compounds known in the art, such as, but not limited to, silicon powder, silicon nanoparticles, and mixtures thereof. The polymer component can be selected from a wide variety of known polymers. Optionally, graphene can be included in the polymer component. Thus, in certain embodiments, the polymer is a mixture of polymer and graphene. The solvent can be selected from known solvents.

The silicon fibers may include a dopant. In certain embodiments, the dopant is selected from any element other than Group IV of the Periodic Table.

The electro-spun silicon fibers can be interconnected to form a web or mat. As mentioned, the diameters of the fibers can vary and in certain embodiments, can be from about 10 nanometers to about 100 microns. In certain embodiments, the electro-spun silicon fibers, are from about 1 to about 7 μm. The individual fibers in the mat, e.g., nonwoven mat, can have a random orientation or can be predominantly oriented in one or more directions.

In accordance with the electro-spinning methods, the resulting electro-spun silicon fibers, have a unique morphology amenable for flexible battery applications. The electro-spun silicon fibers can include silicon, e.g., nanoparticles, embedded in and decorated on the polymer fiber. The fibers can include a composite configuration having a textile-mat-like morphology, e.g., consisting of layers of silicon fibers and polymer. The textile-like mat can be heat treated, for example, at a temperature from 400° C. to 700° C., to produce a flexible composite electrode wherein the silicon (e.g., nanoparticles) are embedded in and decorated on the carbon fibers. As a result of heat treating, the electro-spun composite mats are converted to flexible carbonized mats.

In certain other embodiments, the flexible anode system for use in the invention includes lithium metal anodes (LMAs). The LMAs include porous foam, which may be multilayer porous foam. In certain embodiments, the porous foam consists of a cage-like conductive structure. This structure can allow for lithium cycling without significant anode expansion-contraction. Further, the presence of the structurally isomorphous alloys (SIAs) and use of alloying provide means to circumvent the dendritic structures that are nucleation- and growth-dependent. The SIAs prevent dendritic growth by adopting a non-nucleation-based mechanism. Furthermore, in accordance with the invention, a thin lithium-ion conductor coating (LIC) deposited on the porous foam contributes to preventing orthogonal growth of dendrites. Combining these approaches leads to the formation of composite multilayer anodes consisting of high surface area porous foams of SIA materials (e.g., Li alloy) coated with a thin LIC coating, resulting in specific capacities on the order of about 1600 mAh/g. As aforementioned, the porous foam can also include solid solutions of magnesium with other elements, such as, zinc, aluminum, yttrium, calcium strontium, silver, iron, and mixtures and combinations thereof. These materials and methods are effective to provide LMAs for reversibly storing and cycling lithium with no dendritic growth.

In certain embodiments, the lithium ion conductor includes a ternary lithium silicate, such as lithium orthosilicate ($Li_4SiO_4$), lithium phosphate ($Li_3PO_4$) and/or lithium phosphosulfide ($Li_3PS_4$). Furthermore, a dopant may be used. Various conventional/traditional doping techniques are known in the art. Using suitable doping techniques, such as a facile solid diffusion technique, a dopant is employed to interact with a corresponding site of the $Li_4SiO_4$, $Li_3PO_4$ and/or $Li_3PS_4$. The dopant can interact with the lithium ions and/or the silicon atoms and/or the oxygen atoms of the $Li_4SiO_4$. The dopant can interact with the lithium ions and/or the phosphorus atoms and/or the oxygen atoms of the $Li_3PO_4$. The dopant can interact with the lithium ions and/or the phosphorus atoms and/or the sulfur atoms of the $Li_4PS_4$. Suitable dopants include magnesium, calcium, vanadium, niobium, fluorine, and mixtures and combinations thereof. For interaction with the lithium ions, the dopant can be calcium, magnesium, or mixtures or combinations thereof. For interaction with the silicon and/or phosphorous atoms, the dopant can be vanadium and/or niobium. For interaction with the oxygen and/or sulfur atoms, the dopant can be fluorine.

The lithium ion conductor coating is applied or deposited on a surface of the porous metal alloy foam. However, it is contemplated and understood according to the invention that there may be in-pore lithium ion deposition, i.e., lithium ions may be deposited within the pores that are formed in the porous metal alloy foam when the lithium ion conductor coating is applied or deposited thereon.

Without intending to be bound by any particular theory, it is believed that the presence of the lithium ion conductor coating is effective to mitigate or preclude nucleation and orthogonal growth of dendrites during the charge/discharge cycling of a lithium ion battery to improve the electrochemical performance. Further, it is believed that the in-pore lithium deposition may ensure non-uniform nucleation and growth of lithium leading to coalescence within the pore, preventing dendritic growth perpendicular to the separator and resulting in puncture and eventual failure due to shorting of the cells.

In certain embodiments, the composite multilayer lithium ion battery anode is prepared by forming a porous metal alloy foam and depositing a lithium ion conductor coating on the porous metal alloy foam. As described herein, the foam can include a SIA of a metal, such as but not limited to lithium alloy and optionally magnesium, with a solid solutions of magnesium having one or more other elements, e.g., one or more of zinc, aluminum, yttrium, calcium, strontium, iron and silver. The lithium ion conductor coating includes a ternary lithium silicate, e.g., lithium orthosilicate, lithium phosphate and/or lithium phosphosulfide, and optionally a dopant. The porous metal alloy foam can be deposited on a metal current collector. A wide variety of metals are known in the art for use as current collectors, including but not limited to, copper and stainless steel. The lithium ion conductor coating may be deposited as a thin film. The thickness varies, and may be about one micron thick.

In certain embodiments, the SIA alloy can be synthesized by employing high-energy milling followed by a corresponding heat treatment.

The flexible electrolyte material for use in the invention is a lithium ion conducting composite polymer electrolyte separator (CPE). The CPE includes electrospun poly (vinylidene fluoride-co-hexafluoro propylene) (PVdF-HFP), and the incorporation of PVdF-HFP into a host matrix. In addition to PVdF-HFP, the electrospun host matrix can also include bis(trifluoromethane)sulfonimide lithium salt (LiTFSI), e.g., about 10 wt. %, and particles of nanoparticle silica (nm-$SiO_2$), nanoparticle titania (nm-$TiO_2$) and fumed silica (f-$SiO_2$), e.g., about 10 wt. %.

The CPE provides improved properties and characteristics as compared to separators known in the art, such as but not limited to, liquid lithium electrolyte-based separators. For example, the CPE provided very high lithium ion conductivity, superior flame resistance, mechanically robust membranes with superior yield strength, and very low fade rate during electrochemical cycling due to the preclusion of polysulfide dissolution in a lithium-sulfur battery.

Without intending to be bound by any particular theory, it is believed that the interconnected morphological features of PVdF-HFP occurring as a result of the electrospinning process result in higher lithium ion conductivity, effective lithium ion transport and good interfacial characteristics with a lithium electrode. Higher ionic conductivity and liquid electrolyte up-take (e.g., greater than 250%) with enhanced dimensional stability, lower interfacial resistance and higher electrochemical stability are demonstrated with the CPE in accordance with the invention.

For ease of description, the CPE is described herein with respect to these particular materials. However, it is contemplated and understood that the invention is not limited only to the use of these particular materials. For example, the polymer system or composite is not limited to PVdF-HFP and can include any similar polymer system or composite containing polymer having one or more polar halogen groups. The polymer electrolyte separator of the invention can include any lithium-containing solid or liquid electrolyte, such as but not limited to LiTFSI. Similar electrolytes containing magnesium/sodium suitable for magnesium and sodium ion conduction can be incorporated in the CPE for reversible magnesium and sodium battery applications. Thus, in certain embodiments, the polymer electrolyte separator includes an element selected from magnesium, sodium, and mixtures and combinations thereof. Further, the invention includes nanoparticle filler that may be selected from nano-meter sized particles of various transition metals, as well as metal oxides and metal non-oxides. In certain embodiments, the nanoparticle filler can constitute from 10 to 20 percent by weight. The transition metals, metal oxides and metal non-oxides may be selected from Group III, Group IV, and Group V of the Periodic Table. The metal oxides include, but are not limited to, $SiO_2$, $Al_2O_3$, $B_2O_3$, $TiO_2$, $V_2O_5$, fumed $SiO_2$, and mixtures and combinations thereof. The nanoparticle filler may be doped with a dopant. The doped compositions can include $Al_2O_3$, $B_2O_3$, $GeO_2$, $SnO_2$, $Bi_2O_3$, $Sb_2O_3$, and combinations and mixtures thereof. Additionally, nano-sized metal non-oxide particles including nitrides, carbides, borides, sulfides, selenides, tellurides, phosphides, antimonides, arsenides, bismuthides and mixtures thereof may also be incorporated.

According to the certain embodiments of the invention, there are prepared composites of PVdF-HFP incorporating 10 wt. % LiTFSI and 10 wt. % particles of nanoparticle silica (nm-$SiO_2$), nanoparticle titania (nm-$TiO_2$) and fumed silica (f-$SiO_2$) by electrospinning. These electrospun composites, e.g., membranes, may be activated with lithium sulfur battery electrolyte of 50/50 vol. % dioxolane/dimethoxyethane with 1 M LiTFSI and 0.1 M $LiNO_3$.

The electrospun membranes consist of layers of fibers. In certain embodiments, the membranes include multiple layers of electrospun nanofibers in the form of a nanofiber mat. The diameter of the fibers can vary and in certain embodiments, the average fiber diameter is 1-5 μm or 2-5 μm or 1-2 μm. A CPE with f-$SiO_2$ exhibit higher ionic conductivity (e.g., with a maximum of $1.3 \times 10^{-3}$ S $cm^{-1}$ at 25° C. obtained with 10 wt. % filler composition). An optimum CPE based on PVdF-HFP with 10 wt. % f-$SiO_2$ exhibits enhanced charge-discharge performance in Li—S cells at room temperature (e.g., delivering initial specific capacity of 895 mAh $g^{-1}$ at 0.1 C-rate). The CPE exhibits very stable cycling behavior at well over 100 cycles (fade rate ~0.056%/cycle), demonstrating their suitability for Li—S battery applications. In addition, the interconnected morphological features of PVdF-HFP results in superior mechanical properties (e.g., 200-350% higher tensile strength) and interfacial characteristics reflected as a stabilization of lithium metal anodes in symmetric lithium-metal cells (e.g., stable coulombic efficiency of 99.88% observed over 80 cycles during plating deplating of 12 mAh/$cm^2$ lithium at 3 mA/$cm^2$). Higher ionic conductivity, higher liquid electrolyte uptake (>250%) with dimensional stability, lower interfacial resistance and higher electrochemical stability are demonstrated by the CPE. With these improved performance characteristics, PVdF-HFP is a suitable polymer electrolyte for high-performance Li—S rechargeable batteries.

The CPE may be prepared using conventional electrospinning apparatus and techniques. In certain embodiments, the PVdF-HFP and LiTFSI is dissolved in a solvent to form a homogeneous solution. This solution is dispersed with the nano-filler, e.g., nanoparticles, under sonication. The nano-filler, e.g., nano-particle filler, is prepared in accordance with conventional and other solution and solid state or vapor phase techniques that are known in the art (and described in more detail in the Examples section herein). The composite, e.g., membrane, is prepared by electrospinning of the solution by a conventional electrospinning method at room temperature. The resulting electrospun nanofibers are deposited on a collector, e.g., drum, and dried under vacuum. The nano-particle filler is embedded inside the nanofibers and dispersed on the fiber surface. For example, without intending to be bound by any particular theory, it is believed that the high surface area f-$SiO_2$ filler is advantageous in preventing polysulfide dissolution by forming an insulating film over the cathode. The nanofiber mat formed is heat pressed and activated by soaking in an activation solution, such as a liquid electrolyte (e.g., LiTFSI and $LiNO_3$ in dioxolane/dimethoxyethane). Following uptake of electrolyte, the activated nanofiber mats are then used as a separator-electrolyte complex in a Li—S battery.

In accordance with the invention, each of the separate components, e.g., anode, cathode and CPE, may be assembled into a full cell. The anode, cathode and CPE can be in a stacked configuration wherein the CPE (layer) is positioned between the anode (layer) and the cathode (layer). In certain embodiments, each of a fiber-woven anode, cathode and CPE are then woven together.

EXAMPLES

PVdF-HFP-based CPEs (Composite Polymer Electrolytes) were prepared by a conventional electrospinning technique. Nano-particles, i.e., $SiO_2$(nm-$SiO_2$) and $TiO_2$ (nm-$TiO_2$) prepared using a conventional sol-gel-based nano-fabrication technique and commercially available fumed $SiO_2$(f-$SiO_2$), were used as fillers to improve the mechanical and ionic conducting properties of the CPEs. These nano-filler-incorporated PVdF-HFP composite polymer electrolytes were then tested as separator-electrolytes to improve the cycling stability of commercial sulfur cathodes in Li—S batteries.

Composites of poly (vinylidene fluoride-co-hexafluoro propylene) (PVdF-HFP) incorporating 10 wt % Bis(trifluoromethane)sulfonimide lithium salt (LiTFSI) and 10 wt % particles of nanoparticulate silica (nm-$SiO_2$), nanoparticulate titania (nm-$TiO_2$) and fumed silica (f-$SiO_2$) were prepared by electrospinning. These membranes served as host matrix for the preparation of composite polymer electrolytes (CPEs) following activation with lithium sulfur battery electrolyte comprising 50/50 vol % Dioxolane/Dimethoxyethane with 1 M LiTFSI and 0.1 M $LiNO_3$. The membranes consist of layers of fibers with average fiber diameter of 1-2 μm. CPEs with f-$SiO_2$ exhibited higher ionic conductivity with a maximum of $1.3\times10^{-3}$ S cm$^{-1}$ at 25° C. obtained with 10 wt % filler composition. The optimum CPE based on PVdF-HFP with 10 wt % f-$SiO_2$ exhibited enhanced charge-discharge performance in Li—S cells at room temperature, delivering initial specific capacity of 895 mAh g$^{-1}$ at 0.1 C-rate. The CPEs also exhibited very stable cycling behavior well over 100 cycles (fade rate ~0.056%/cycle), demonstrating their suitability for Li—S battery applications. In addition, the interconnected morphological features of PVdF-HFP result in superior mechanical properties (200-350% higher tensile strength) and interfacial characteristics reflected in the stabilization of lithium metal anodes in symmetric lithium-metal cells (stable coulombic efficiency of 99.88% observed over 80 cycles during plating and deplating of 12 mAh/cm$^2$ lithium at 3 mA/cm$^2$). Higher ionic conductivity, higher liquid electrolyte uptake (>250%) with dimensional stability, lower interfacial resistance and higher electrochemical stability are some of the attractive attributes witnessed with these CPEs. With these improved performance characteristics, the PVdF-HFP system can be considered as suitable polymer electrolytes for high-performance Li—S rechargeable batteries.

Example 1

Materials

The polymer: poly(vinylidene fluoride-co-hexafluoropropylene) (PVdF-HFP) (Mw~400,000, Aldrich), solvents: N, N-Dimethylformamide (DMF) (ACS reagent, ≥99.8%, Aldrich), acetone (ACS reagent, ≥99.5%, Aldrich) and lithium salt: bis(trifluoromethane)sulfonimide lithium salt (LiTFSI) (99.95% trace metals basis, Aldrich) were vacuum dried for 12 h at 60° C., and then used in an electrospinning process.

Commercially available fumed silica: f-$SiO_2$ (0.007 μm powder, Aldrich) was used without any treatment. Reagents for nm-$SiO_2$ and nm-$TiO_2$ nanoparticles synthesis: tetraethyl orthosilicate (TEOS) (99.99%, Aldrich), titanium(IV) isopropoxide (TTIP) (97%, Aldrich), ethanol (99.99%, Aldrich), 2-propanol (ACS reagent, ≥99.5%, Aldrich), hydrochloric acid (ACS reagent, 37%, Aldrich) and ammonium hydroxide (ACS reagent, 28.0-30.0% $NH_3$ basis, Aldrich) were used without any further purification. Milli-Q water (18.2Ω) was used throughout the experiment.

Preparation of PVdF-HFP Nanofiber Membrane

For preparation of the CPEs, PVdF-HFP (10 w %) and LiTFSI (0.1 w %) were dissolved in a mixed solvent of DMF/acetone (7:3, w/w) at 50° C. for 12 h until a homogeneous solution was formed. The resulting solution was dispersed with (0.1 w %) nano-filler (nm-$SiO_2$/nm-$TiO_2$/f-$SiO_2$) under sonication for 12 hrs. The CPEs were prepared by a conventional electrospinning method at room temperature. Electrospinning of the nano-filler dispersed solution was performed at a flow rate of 1 ml/h and a high voltage of 20 kV at room temperature, with 15 cm distance maintained between the tip of the syringe and rotating drum. The nanofibers deposited onto the rotating drum were collected, dried under vacuum for 12 h at 60° C. at 1 atm. The nanofiber mats were then heat pressed at 80° C. for 30 min at 1 atm and activated by soaking in 1.8 M LiTFSI and 1 M $LiNO_3$ in 1:1 vol. % dioxolane/dimethoxy ethane for 30 min before use as a separator-electrolyte complex in Li—S battery.

Preparation of $SiO_2$ Nanoparticles $SiO_2$ nanoparticles were prepared by hydrolysis of TEOS in an ethanol medium in the presence of ammonium hydroxide. Initially, 3 ml of TEOS was mixed with 20 ml ethanol under sonication. Then, 20 ml ammonium hydroxide solution (28-30%) was added to this solution under sonication to promote the polymerization and condensation reaction. The white turbid solution of $SiO_2$ nanoparticles was centrifuged and dried under vacuum for 12 h. The $SiO_2$ nanoparticles were then heated at 700° C. for 4 h to remove any of the polymeric carbon residues.

Preparation of $TiO_2$ Nanoparticles $TiO_2$ nanoparticles were prepared by the hydrolysis of TTIP in propyl alcohol, wherein 0.5 ml TTIP was dissolved in 10 ml isopropyl alcohol, and then the solution was added drop-wise into 40 ml water containing 2.5 ml HCl under sonication. The colloidal solution formed by polymerization and condensation was then filtered and dried under vacuum for 12 hrs. The fine powders of $TiO_2$ obtained after drying were calcined at 800° C. for 3 h.

Materials Characterization and Electrochemical Measurements:

The nature of the nanoparticle fillers and the electrospun CPE membranes was evaluated with respect to cycling stability. The microstructure of the nanofillers and electrospun CPE membranes was assessed by conducting scanning electron microscopy (SEM) analysis on a Philips XL30 machine operating at 20 kV. The crystal structure of the synthesized nm-$TiO_2$, nm-$SiO_2$ and f-$SiO_2$ nanoparticles was characterized by X-ray diffraction using Philips XPERT PRO system employing CuKα (λ=0.15406 nm). The scans were recorded in 2θ range of 10°-90°, at a constant current of 40 mA and voltage of 45 kV. The nature of chemical bonding in the CPEs was analyzed by attenuated total reflectance Fourier transform infrared spectroscopy (ATR-FTIR, Nicolet 6700 spectrophotometer, Thermo Electron Corporation) using a diamond ATR Smart orbit. Spectra were obtained at 1 cm$^{-1}$ resolution averaging 64 scans in the 400-4000 cm$^{-1}$ frequency range. The surface chemistry of the CPEs was probed by X-ray photoelectron spectroscopy (XPS) using an ESCALAB 250 Xi system (Thermo Scientific) equipped with a monochromated Al Kα X-ray source. Beams of low-energy (≤10 eV) Ar$^+$ ions and low-energy electrons guided by magnetic lens were used to provide uniform charge neutralization. The standard analysis spot of 400×400 μm$^2$ was defined by the microfocused X-ray source. The measurements were performed at room temperature in an ultra-high vacuum (UHV) chamber with the base pressure <5*10-10 mBar (the charge neutralization device produced 2*10$^{-10}$ mBar partial pressure of Ar during measurements). The Avantage software package (Thermo Fisher Scientific) was used to fit the elemental spectra based on calibrated analyzer transmission functions, Scofield sensitivity factors, and effective attenuation lengths for photoelectrons from the standard TPP-2M (Tanuma Powell and Penn-2M) formalism. The mechanical properties of the CPEs were analyzed to explain the improved electrochemical performance of the CPEs. The stress-strain behavior of the polymer membranes was studied using Instron Universal Tensile Tester, Model 1123. The pore characteristics and specific surface area (SSA) of the nano filler samples were analyzed on a Micromeritics ASAP 2020 Physisorption analyzer, using the Brunauer-Emmett-Teller (BET) isotherm generated. The powders were first vacuum degassed and then tested for nitrogen adsorption and desorption for surface area analysis.

Electrochemical Characterization

Electrodes for battery half-cell characterization were prepared by casting a slurry of 70 wt. % commercial sulfur, 20 wt. % acetylene black and 10 wt. % PVdF in N-methyl pyrrolodine (NMP) onto aluminum foil followed by drying under vacuum for 24 hrs. A uniform electrode sulfur loading varying between 1.5 mg-2 mg cm/$cm^2$ was maintained for all the electrochemical measurements. Coin cells, i.e., 2025-type coin cells, were assembled in an Innovative, Inc. glove box (UHP Argon, <0.1 ppm $O_2$, $H_2O$) with sulfur-coated electrodes as the working electrode, lithium foil as the counter electrode, Celgard 2400 polypropylene (PP) as the separator, and 1.8 M LiTFSI (bis(trifluoromethane)sulfonamide lithium salt) in 1:1 vol. % 1, 3 dioxolane and 1, 2 dimethoxyethane with 0.1 M $LiNO_3$ as the electrolyte. The electrochemical cycling behavior of the cells thus prepared was studied by cycling between 1.7-2.6 V (wrt Li+/Li) at 0.1 C (~162 mA/g) current rate using an Arbin BT200 battery testing system. Ion conductivity of GPEs was studied by AC impedance spectroscopy in Gamry Potentiostat. Polymer membranes were secured between two steel disks and studied at a high frequency range (10-100 kHz) at 10 mA amplitude. Equivalent circuit modeling was performed using Z-view 2.0 (Scribner Associates Inc.) to obtain the CPE ionic conductivity values.

The superior mechanical strength of the CPE electrodes was also shown to be effective in improving the coulombic efficiency of lithium metal anodes by testing in lithium symmetric cells consisting of two electrodes of 22 mg of lithium (1 $cm^2$ area) assembled with the optimal CPE (f-$SiO_2$) as the separator. Lithium was plated and deplated from the working electrode at a rate of 3 mA/$cm^2$ for 4 hours (12 mAh/$cm^2$) and overpotential of plating/deplating was studied to provide an estimate of promising stabilization of lithium metal anodes afforded by the CPEs. Control experiments involved the use of liquid electrolyte soaked Celgard membrane as the separator.

Results and Discussion

SEM Analysis Of nanofiller Particles

FIG. 1 shows the morphology of nm-$SiO_2$, nm-$TiO_2$ and f-$SiO_2$ nanoparticles studied using Scanning Electron Microscopy (SEM). The nm-$SiO_2$ and nm-$TiO_2$ (FIG. 1a,b) were observed to be spherical with a uniform particle size distribution. The nm-$SiO_2$ nanoparticles had an average particle diameter of ~200 nm which was further confirmed by a Dynamic Light Scattering (DLS) technique. The nm-$TiO_2$ particles were almost spherical shaped with ~150 nm diameter. The SEM of f-$SiO_2$ was performed at a higher magnification and showed agglomerates of nano-meter sized individual particles. This confirms the extremely small (~7 nm) particle size of f-$SiO_2$ mentioned in the product specification (Sigma Aldrich, Inc.). The XRD patterns obtained from both nm-$SiO_2$ and f-$SiO_2$ showed patterns that corresponded to amorphous structures, indicating the amorphous nature of both the $SiO_2$ samples. However, the XRD pattern of $TiO_2$ showed crystalline peaks corresponding to rutile structure.

Surface Area Analysis

The specific surface area of the nanofillers is a factor in determining the electrochemical performance of the CPEs. It has been observed that smaller size particles for a similar volume fraction of the ceramic filler phase impart an improved performance as compared to larger size particles because of their ability to cover more surface area. BET surface area analyses of the nanofillers are presented in Table 1.

TABLE 1

BET surface area analysis of nm-$SiO_2$, nm-$TiO_2$ and f-$SiO_2$

| Sample | BET Surface Area ($m^2$/g) | Langmuir Surface Area/ ($m^2$/g) | Total Pore Volume ($cm^3$/g) | Adsorption averam pore width (nm) |
|---|---|---|---|---|
| f-$SiO_2$ | 191.61 | 329.19 | 0.42 | 8.72 |
| nm-$SiO_2$ | 18.03 | 22.36 | 0.21 | 7.96 |
| nm-$TiO_2$ | 6.47 | 10.18 | 0.17 | 10.90 |
| Celgard 2400 | 46.42 | 52.62 | 0.12 | 24.64 |
| PVdF-HFP + f-$SiO_2$ | 217.20 | 342.5 | 0.53 | 14.42 |
| PVdF-HFP + nm-$SiO_2$ | 99.04 | 100.02 | 0.25 | 15.2 |
| PVdF-HFP + nm-$TiO_2$ | 72.6 | 86.5 | 0.21 | 12.2 |

The BET surface area results indicated that f-$SiO_2$ had a high BET surface area of 191.61 $m^2$/g which was closer to the value (175-225 $m^2$/g) from the product specifications. The f-$SiO_2$ also exhibited a high pore volume of 0.417 $cm^3$/g. In contrast, the nm-$SiO_2$ and nm-$TiO_2$ showed lower surface areas of 18.03 and 6.47 $m^2$/g, respectively. The very high surface area of f-$SiO_2$ is expected to improve the performance of CPEs as compared to other fillers. Table 1 also shows the surface areas and porosities of nm-$SiO_2$, f-$SiO_2$ and nm-$TiO_2$ incorporated PVDF-HFP hybrid membranes. For comparison, the porosity of a commercial polypropylene (PP) membrane separator (Celgard 2400) is also shown. The BET surface area of this polypropylene membrane was 46.42 $m^2$/g, comparable to the values reported in literature. It is seen that the porosities of the hybrid membranes are significantly greater than that of the microporous PP membrane. The PVDF-HFP nanofibers formed freestanding nonwoven membranes that have relatively high porosities. The introduction of nm-$SiO_2$ and nm-$TiO_2$ nanoparticles further increased the porosity values due to the extra surface area of nanoparticles. However, owing to the very high surface area of f-$SiO_2$, the BET surface area of f-$SiO_2$ incorporated PVDF-HFP membrane was found to 217.2 $m^2$/g, about twice that of the other nanofiller counterparts.

SEM Analysis of the Nanofibers

Figure 2:
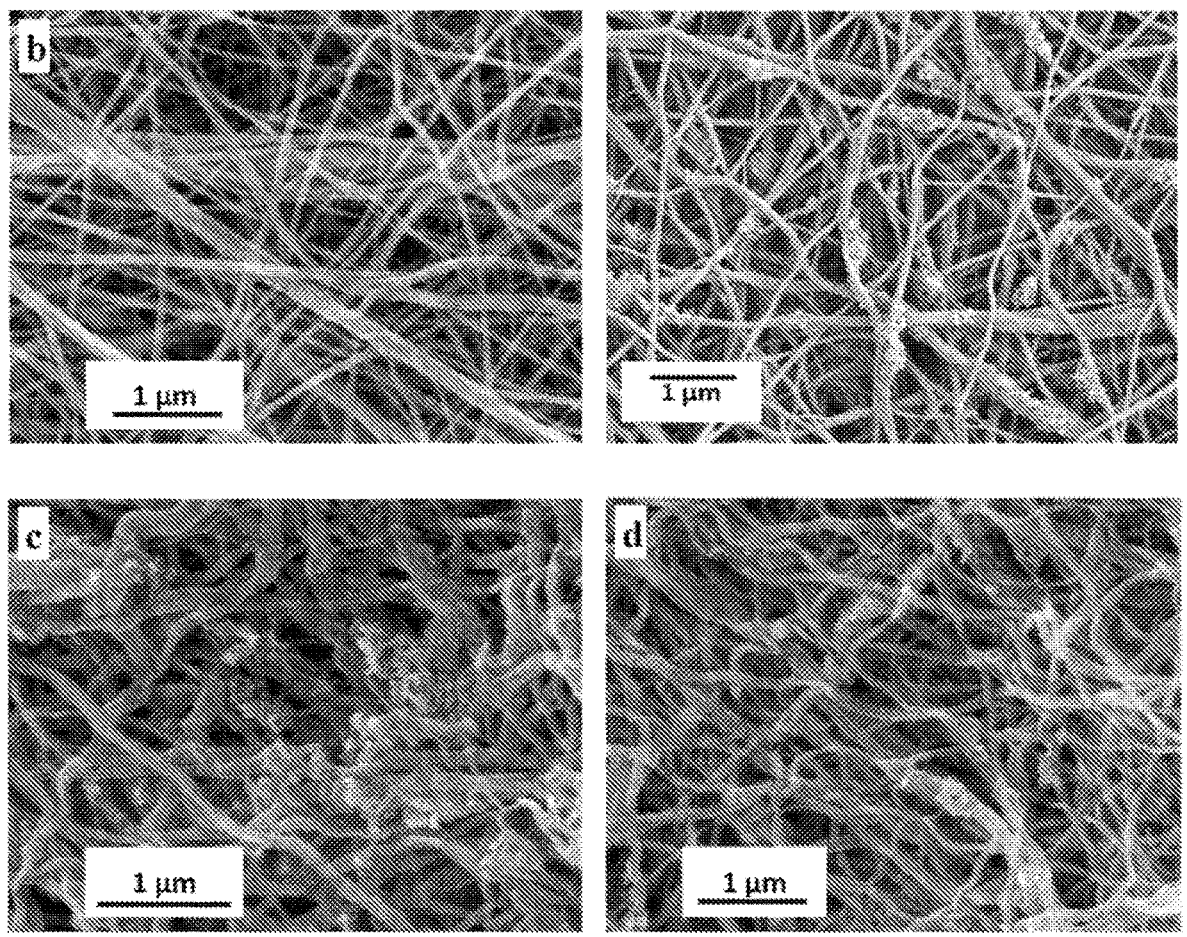
FIG. 2 includes SEM images showing a) electro spun PVdF-HFP polymer membranes with dissolved LiTFSI, electro spun PVdF-HFP with dissolved LiTFSI (10 wt. %) and dispersed f-$SiO_2$ (10 wt. %), electro spun PVdF-HFP with dissolved LiTFSI (10 wt. %) and dispersed nm-$SiO_2$ (10 wt. %), and electrospun PVdF-HFP with dissolved LiTFSI (10 wt. %) and dispersed nm-$TiO_2$ (10 wt %), in accordance with certain embodiments of the invention.
Figure 3:
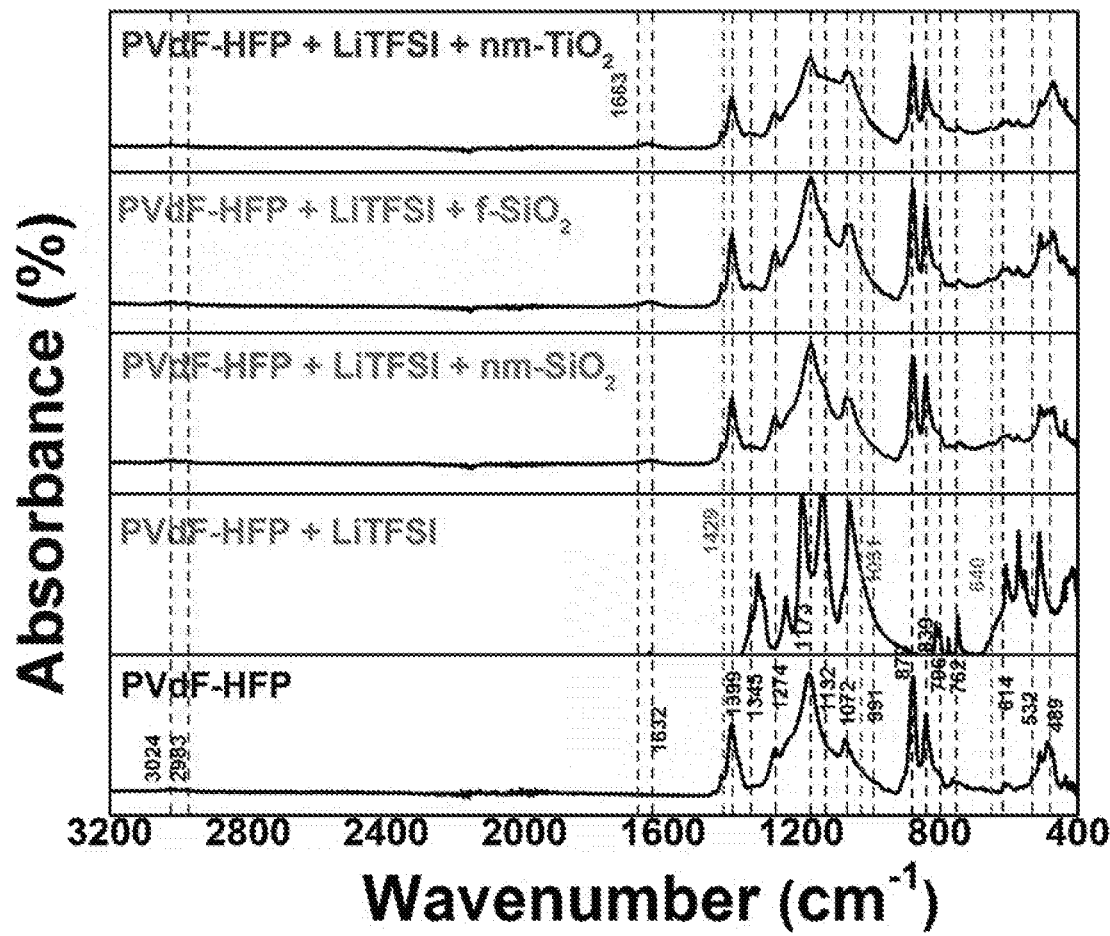
FIG. 3 includes FTIR spectra showing pure PVDF-HFP, PVDF-HFP with 10 wt. % LiTFSI and various nanofillers (10 wt. %), in accordance with certain embodiments of the invention.

For effective battery separator applications, electrospun polymer mats are usually required to be of uniform fiber thickness with a bubble-free morphology. Formation of bubble-like structures typically results in non-uniform pore distribution in the mats and a decrease in nanofiller exposure to the surface. To assess the morphological characteristics of the membranes, the electrospun polymer mats were analyzed using the SEM technique. The SEM micrographs of PVDF-HFP membranes with 10 wt. % dissolved LiTFSI (FIG. 2a) showed an inter-penetrated fibrous network potentially resulting in improved mechanical strength in the CPEs. The membranes also exhibited a uniform and beadfree morphology with fibers of ~175 nm diameter. SEM images of PVdF-HFP+LiTFSI membranes with dispersed 10 wt. % f-SiO$_2$, nm-SiO$_2$ and nm-TiO$_2$ (FIG. 2b-d) indicated that the introduction of nanofillers did not change the morphology of the electrospun PVDF nanofibers. However, the nanoparticles were both embedded inside the nanofibers and dispersed on fiber surface, which was clearly observed in the SEM EDS mapping of the filler incorporated polymer mats. The surface roughness increased upon introduction of nanofillers, while the average diameter of nanofibers was largely unaffected. The exposure of nm-TiO$_2$, nm-SiO$_2$ and f-SiO$_2$ nanofillers on fiber surfaces allowed them to increase accessible surface area and form extensive Lewis acid/base interactions with the ionic species in the liquid electrolyte possibly resulting in higher ionic conductivities.

FTIR Analysis

Any change in the chemical nature of PVdF-HFP membranes upon addition of LiTFSI salt and nanofillers (f-SiO$_2$, nm-SiO$_2$ and nm-TiO$_2$) was evaluated with respect to chemical stability of the CPEs during electrochemical cycling. The nature of chemical bonding in PVdF-HFP and LiTFSI was analyzed using FTIR spectroscopy for comparison with LiTFSI incorporated polymer membranes. PVdF-HFP being a semi-crystalline polymer, the FTIR spectra of pure PVdF-HFP contained some crystalline (α-phase) and amorphous (β-phase) phase related peaks. The bands of pure polymer PVdF-HFP due to the crystalline phase (α-phase) were observed at 489, 532, 614, 762, 796 and 976 cm$^{-1}$ and the bands related to the amorphous phase (β-phase) were observed at 839 cm$^{-1}$ and 879 cm$^{-1}$.

The addition of LiTFSI to the PVdF-HFP membranes introduced three distinct peaks at 1058, 1630 and 574 cm$^{-1}$ in the FTIR spectrum, in addition to the peaks corresponding to PVDF-HFP polymer. These observations exactly overlap prior art findings on FTIR analysis of the interaction of LiTFSI with PVdF-HFP according to which the peaks at 1058 and 574 cm$^{-1}$ are due to asymmetric —S—N—S— stretching of LiTFSI and asymmetric CF$_3$ bending vibrations of LiTFSI salt, respectively, and the peak at 1630 cm$^{-1}$ is due to complexation between polymer backbone and LiTFSI salt. The retention of all the characteristic peaks of PVdF-HFP, even upon addition of LiTFSI, indicated the absence of any form of chemical reaction between the polymer and salt.

Comparing the spectra of PVdF-HFP before and after incorporation of nano-filler, the intensity of the broad band centered at 1070 cm$^{-1}$ clearly increased for SiO$_2$-incorporated PVdF-HFP using the C—F symmetric stretching band at 879 cm$^{-1}$ as referenced. This is due to the overlap of the band from the F—C—F symmetric stretching vibration at 1072 cm$^{-1}$ and the band from the Si—O—Si anti-symmetric stretching vibration at 1070 cm$^{-1}$, indicating the binding of Si—O— to the polymer.

In PVDF-HFP membranes incorporated with TiO$_2$, the NH$_2$ group usually observed at 1600 cm$^{-1}$ had shifted to the lower wave number around 1580 cm$^{-1}$. In addition, the peak at 1663 cm$^{-1}$ became prominent due to enhanced —C═O stretching due to interaction with TiO$_2$. This indicated the fact that a greater number of ions coordinate with —NH$_2$. The new interaction of salt-TiO$_2$ and TiO$_2$-polymer in the FTIR spectra of PVDF-HFP hybrid membranes can be expected to improve the ionic conductivity of the system on the fiber surface.

Mechanical Properties

Figure 4:
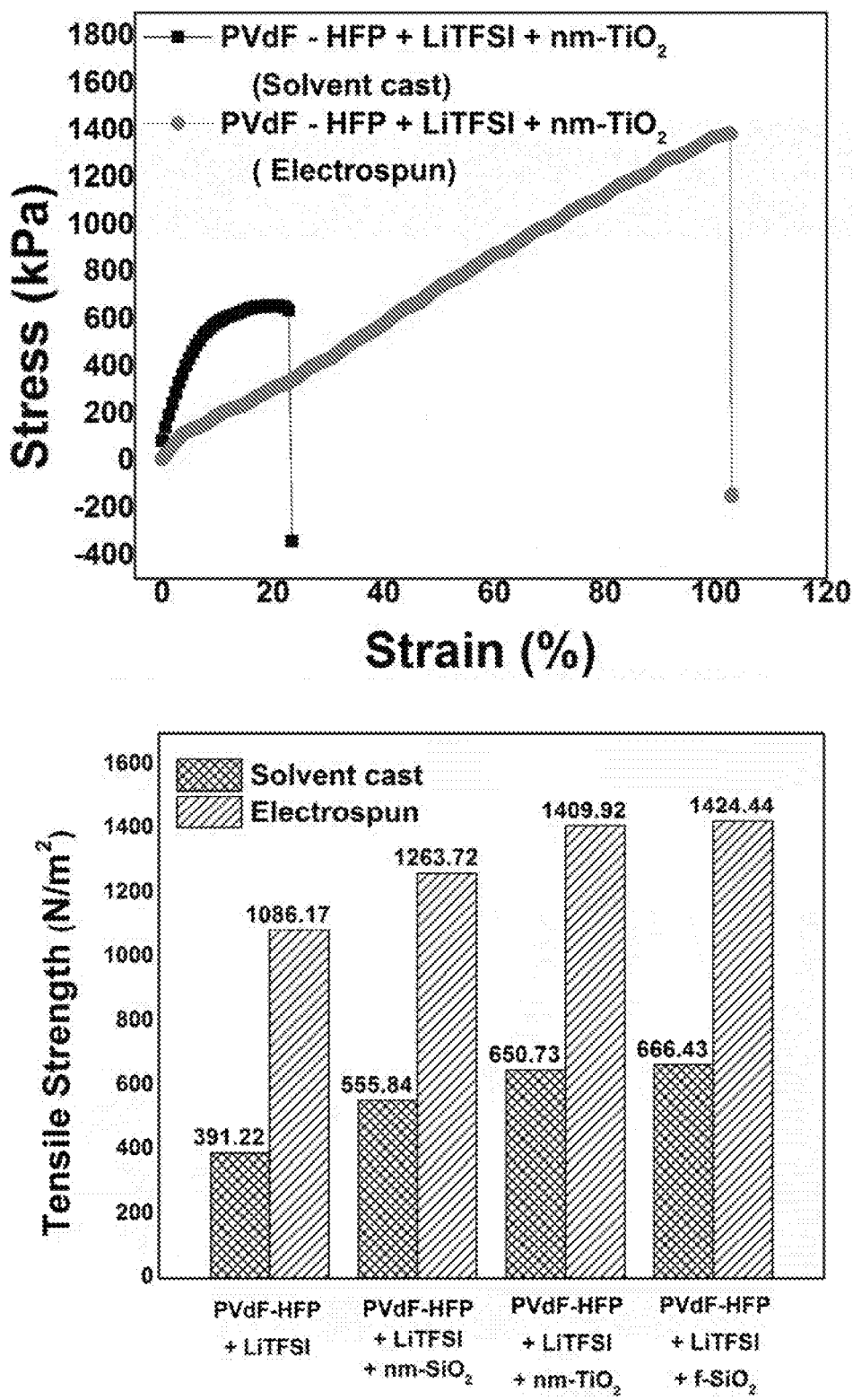
FIG. 4 includes plots showing a stress versus strain relationship for nm-$TiO_2$ incorporated membranes and comparison of tensile strength of various electrospun and solvent cast membranes, in accordance with certain embodiments of the invention.

The mechanical properties of the electrospun polymer membranes are important for effective application in batteries as separators. In electrospun membranes, mechanical properties are improved due to entanglement of singular fibers aided by the presence of nanoparticle fillers. The mechanical properties of the electrospun membranes were compared with that of solution cast membranes of the same composition to demonstrate the superior properties attained by employing the electrospinning method. The thickness of both electrospun and solvent cast membranes used for mechanical property measurements was maintained uniformly at 0.035±0.005 mm. The Strain vs Stress and Tensile Strength of the hybrid membranes characterized by tensile measurements is represented in FIG. 4. Both the solvent cast and electrospun samples exhibited a linear elastic behavior comparable to the results from similar systems reported in literature. The tensile strength of electrospun membranes was uniformly superior to that of solvent cast membranes due to the enhanced elastic nature of the electrospun membranes. For example, the tensile strength increased from 650.73 MPa for solvent cast PVdF-HFP+LiTFSI+nm-TiO$_2$ membrane to 1409.92 MPa for electrospun membranes, (FIG. 4a) confirming the effect of electrospinning on improving the tensile properties of the hybrid membranes.

Electrolyte Uptake

The relationship of electrolyte uptake of the nanofiber membranes with time, obtained by soaking the nanofiber membranes in the liquid electrolyte of 1.8 M LiTFSI and 0.1 M LiNO$_3$ in 1:1 vol. % dioxolane and dimethoxyethane for a period of 30 min, was evaluated. The electrolyte uptake was observed to stabilize within the initial 10 minutes of exposure to electrolyte for all the hybrid polymer membranes. The electrolyte uptake of f-SiO$_2$ membranes was ~219% which is about four times higher than the uptake of commercial polypropylene (PP) separator which was ~63%. As expected, the higher pore volume of the f-SiO$_2$ material (Table 1) resulted in the highest electrolyte uptake for the same (Table 2). The high retention ability and faster penetration of liquid electrolyte into the fibrous membranes were due to the unique pores generated from the interconnected fibers which in turn increased the ionic conductivity. PVDF-HFP+LiTSI membranes showed a very high uptake value ~550% due to uncontrolled swelling of membranes resulting from lack of mechanical integrity due to absence of filler particles.

TABLE 2

Electrolyte uptake studies on the polymer membranes

| Sample | Electrolyte uptake after 10 min (%) | Electrolyte uptake after 30 min (%) | Electrolyte uptake After 60 min (%) |
|---|---|---|---|
| PVdF – HFP + LiTFSI | 436.67 | 550 | 551.5 |
| PVdF-HFP + LiTFSI + nm-SiO$_2$ | 182.5 | 190.5 | 190.5 |
| PVdF-HFP + LiTFSI + f-SiO$_2$ | 207.5 | 219 | 220 |
| PVdF-HFP + LiTFSI + nm-TiO$_2$ | 253.5 | 266.5 | 270 |
| Commercial PP separator | 59.5 | 63 | 63 |

Ionic Conductivity Studies

Figure 5:
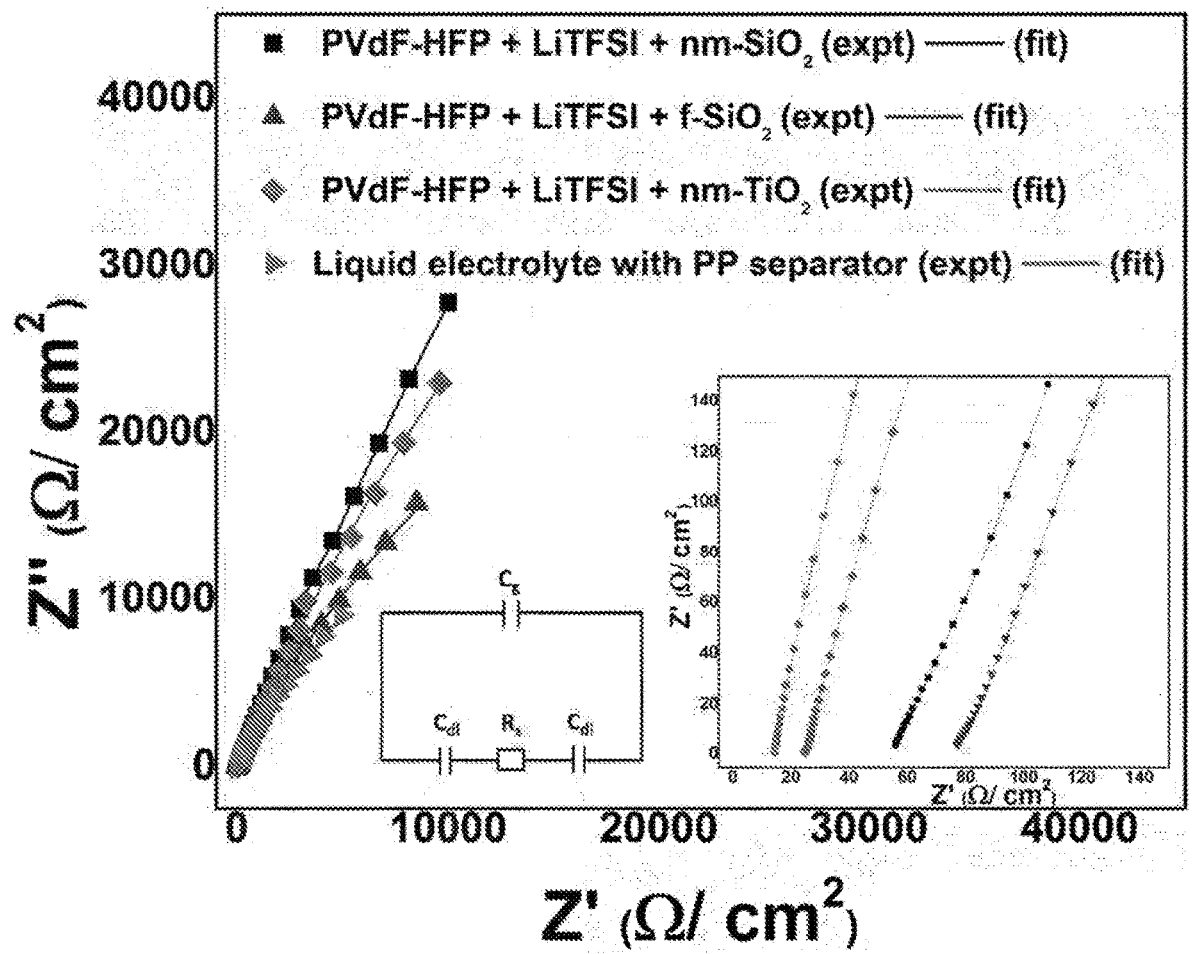
FIG. 5 is a fitted Nyquist plot for the polymer membranes along with the equivalent circuit, in accordance with certain embodiments of the invention.

For CPEs, their room temperature ionic conductivity should be close to liquid electrolytes to have acceptable electrochemical properties for application in Li-ion batteries. Electrochemical impedance spectroscopy (EIS) analysis of the CPEs was performed with stainless steel blocking electrodes on both sides. Nyquist plots of the EIS analysis of CPEs are shown in FIG. 5. Impedance plots were modelled to the general equivalent circuit where R$_s$ represents the electrolyte resistance, C$_{dl}$ represents the capacitive coupling between the ionic conduction in the electrolyte and the electronic conduction in the measuring circuit, and $C_g$ is the geometrical capacitance representing the capacitive effects of the cell hardware and of the electrical leads using Z-view 2.0. The electrolyte conductivity was calculated using $R_s$, thickness of the polymer membrane (t) and the surface are of the electrolyte sample, A, using the equation given below:

$$\sigma = \frac{t}{R_s A}$$

The room temperature conductivities of the polymer electrolytes were in the order of ~$10^{-3}$ S cm$^{-1}$ which is in line with several reports. From the conductivity value of the electrolyte, it was seen that there was an increase in ionic conductivity of the CPE systems in comparison with the liquid electrolyte based separator. This was due to enhanced electrolyte uptake due to the nanoporous structure of the electrospun membranes. The PVdF-HFP membranes with nm-SiO$_2$ fillers showed the highest room temperature conductivity of $9.4749 \times 10^{-3}$ S cm$^{-1}$. This was slightly unexpected due to the higher uptake observed for f-SiO$_2$, indicating that ionic conductivity in composite polymer electrolytes depended not only on the electrolyte uptake (Table 2) and pore volume (Table 1), but also on the nature of bonding of filler particles with the liquid electrolyte.

TABLE 3

Ionic conductivity of commercial electrolyte and various polymer membrane electrolytes

| Sample Composition | Conductivity (S/cm) |
|---|---|
| Commercial separator with liquid electrolyte | $1.283 \cdot 10^{-3}$ |
| PVdF-HFP + LiTFSI + nm-TiO$_2$ | $1.881 \cdot 10^{-3}$ |
| PVdF-HFP + LiTFSI + f-SiO$_2$ | $3.009 \cdot 10^{-3}$ |
| PVdF-HFP + LiTFSI + nm-SiO$_2$ | $9.4749 \cdot 10^{-3}$ |

Electrochemical Cycling Performance

Figure 6:
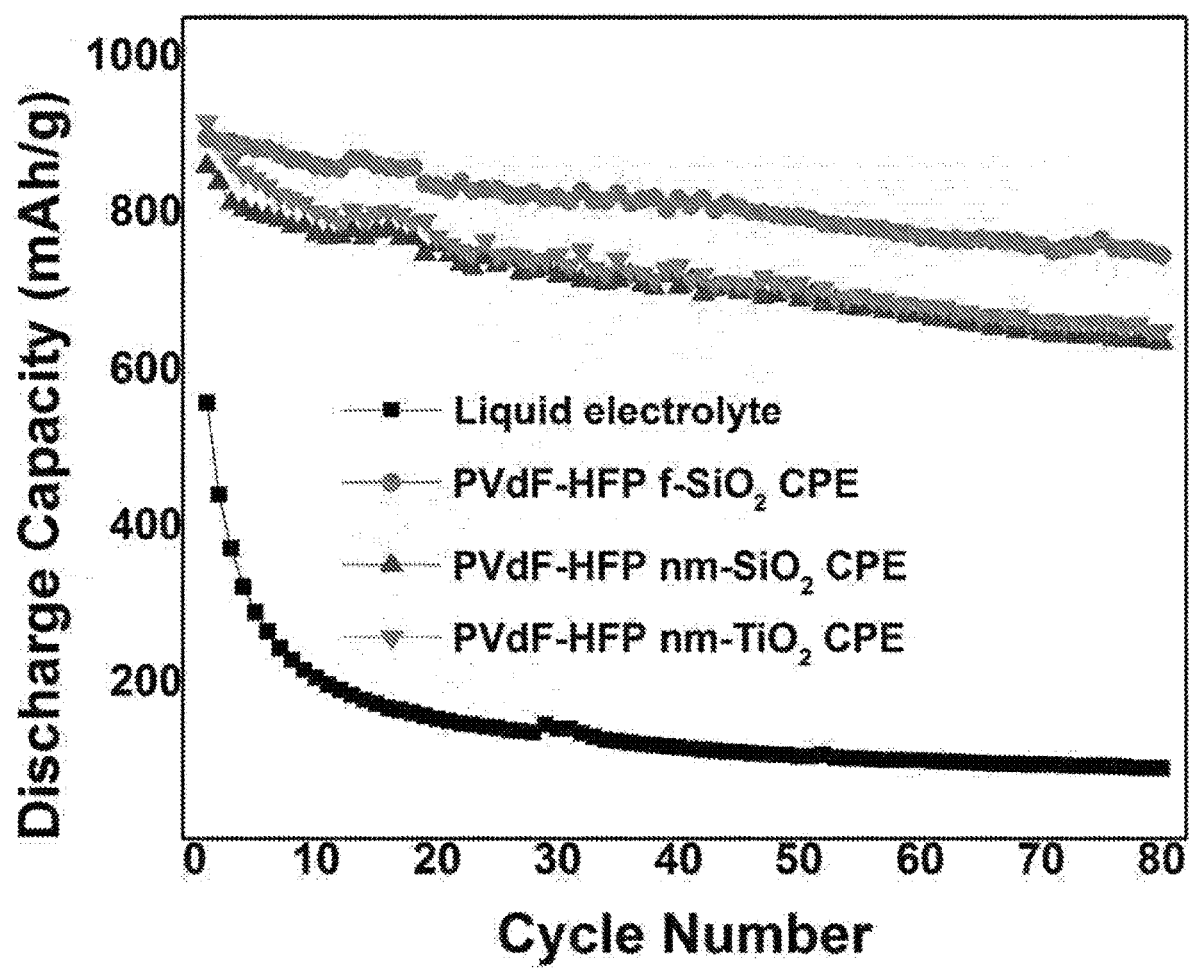
FIG. 6 is a plot that shows electrochemical charge—discharge performance of polymer membranes, in accordance with certain embodiments of the invention.

The electrochemical performance of the PVdF-HFP composite polymer electrolytes were studied by performing electrochemical charge-discharge cycling against commercial sulfur cathodes. The electrochemical cycling performance of the polymer electrolytes is shown in FIG. 6. The S-CPE electrodes and commercial sulfur electrodes were cycled at 0.1 C-rate with an average sulfur loading of ~2 g cm$^{-2}$ electrode area. The PVdF-HFP-f-SiO$_2$ hybrid polymer separator shows an initial capacity of 895 mAh g$^{-1}$ and a stable capacity of 845 mAh g$^{-1}$ after 100 cycles (fade rate 0.055%/cycle). On the other hand, the PVdF-HFP-nm-SiO$_2$ shows an initial discharge capacity of 860 mAh g$^{-1}$ which stabilizes at 734 mAh g$_{-1}$ after the 100 cycles cycle (0.146%/cycle). The PVdF-HFP nm-TiO$_2$ separators showed an initial capacity of 915 mAh g$_{-1}$ and stabilized at 749 mAh g$^{-1}$ (0.18%/cycle). However, commercial separator along with liquid electrolyte cycled opposite commercial sulfur cathode gave an initial capacity of 557 mAh g$^{-1}$ which quickly faded to 132 mAh g$^{-1}$ in less than 10 cycles. The enhanced electrochemical cycling performance of the f-SiO$_2$ incorporated CPE is attributed to the higher surface area and pore volume of the filler particles that facilitated the formation of an insulated layer of ceramic particles at the electrode surface that impede electrode reactions. This phenomenon was observed in the an when excessive amounts of the passive ceramic phase were introduced into the polymer matrix. This insulation layer, in addition to impeding surface reactions facilitates prevention of polysulfide dissolution in Li—S battery which supports the superior performance of the f-SiO$_2$ CPE over other fillers.

XPS Analysis of Separators Post Cycling

Figure 7:
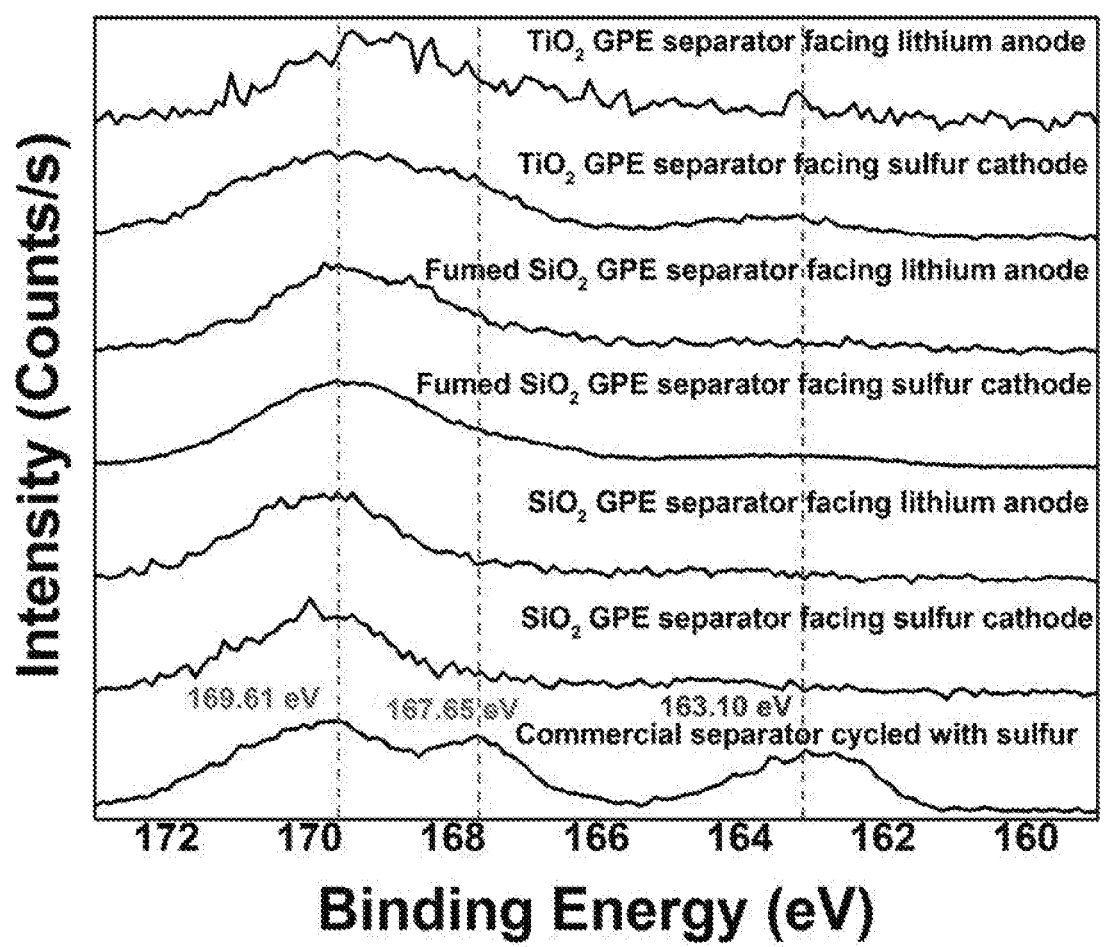
FIG. 7 is a plot that shows S2p X-ray photoelectron spectroscopy (XPS) spectrum of different separators before and after cycling, in accordance with certain embodiments of the invention.

To understand the origin of the cycling stability of the hybrid polymer membranes, XPS analysis was performed on the polymer electrolyte separators after 100 cycles. XPS was performed on both the side facing the sulfur cathode and the side facing the lithium anode. FIG. 7 represents the XPS of the polymer electrolyte membranes post cycling. The peak at 169.61 eV represents S2p peak corresponding to sulfur binding in LiTFSI, the peak at 167.65 eV and 163.10 eV corresponds to higher order polysulfide and Li$_2$S, respectively. Commercial separator and liquid electrolyte cycled with sulfur cathodes showed peaks corresponding to both higher and lower order polysulfide confirming polysulfide dissolution in liquid electrolyte system. However, these polysulfide peaks were absent in the polymer electrolyte membranes facing the lithium anode confirming the absence of polysulfide dissolution into the electrolyte. In contrast, the side of the fumed SiO$_2$ and TiO$_2$ incorporated polymer membrane facing the sulfur cathode showed very mild peak at 163.1 eV corresponding to Li$_2$S. This may be due to surface adsorbed Li$_2$S molecules and not dissolution of polysulfide.

FTIR Analysis Post Cycling

Figure 8:
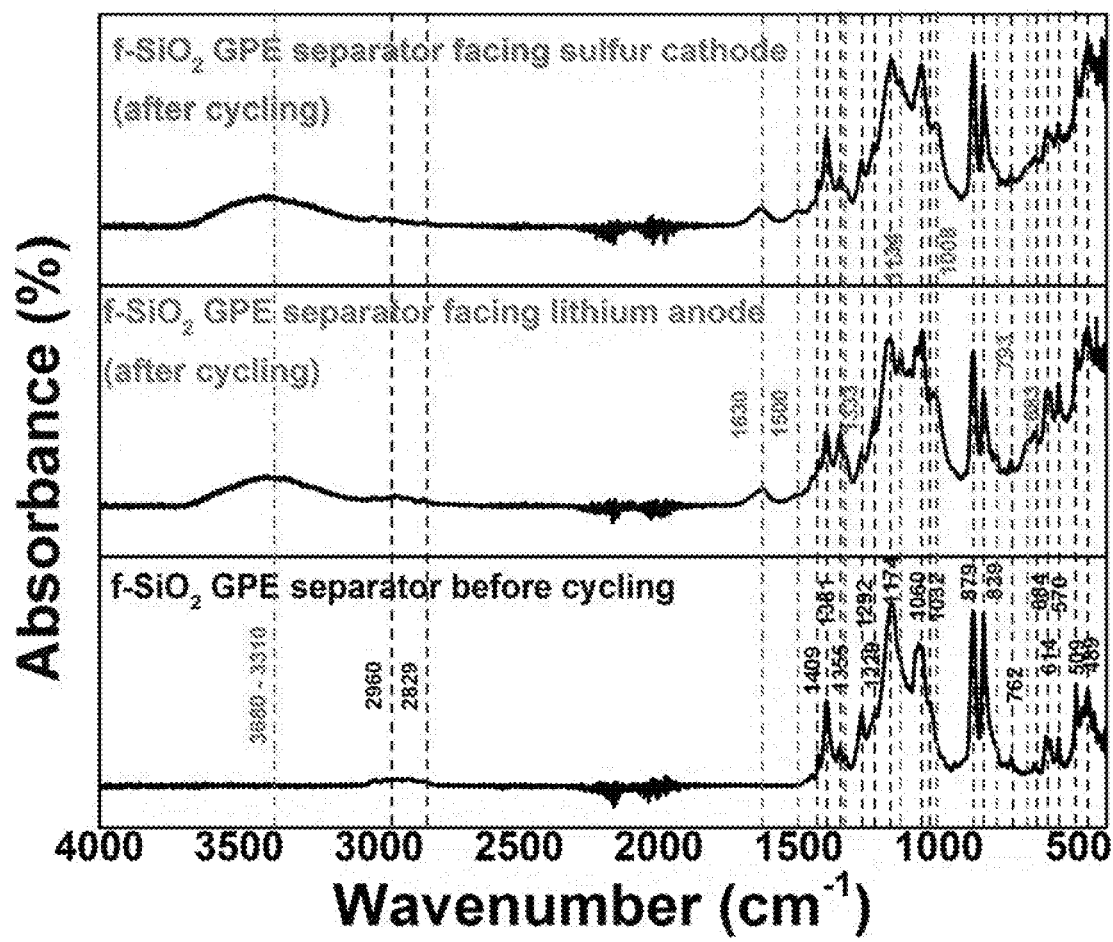
FIG. 8 is a plot that shows FTIR spectrum of a $SiO_2$ polymer electrolyte membrane before and after 100 cycles (side exposed to lithium anode and sulfur cathode), in accordance with certain embodiments of the invention.

Structural and chemical stability of the polymer membranes are important parameters in determining the long-time performance of polymer electrolytes. FTIR analysis was performed on the membranes after cycling to understand the change in chemical nature after cycling. The FTIR spectrum of PVdF-HFP+LiTFSI+SiO$_2$ separator (activated by soaking in 1.8 M LiTFSI and 1 M LiNO3 in 1:1 vol. % dioxolane and dimethoxy ethane for 30 min) before and after 100 charge-discharge cycles is shown in FIG. 8. The side of the separator facing lithium anode and the one facing sulfur cathode were analyzed using FTIR.

The FTIR spectrum of PVDF-HFP+LiTFSI+SiO$_2$ membrane soaked in electrolyte showed peaks corresponding to PVdF-HFP. In addition, the peak at 1032 cm$^{-1}$ and 1070 cm$^{-1}$ corresponded to the introduction of SO$_3^{-1}$ group and overlap of F—C—F symmetric stretching vibrations and Si—O—Si asymmetric stretching vibrations resulting from LiTFSI and SiO$_2$, respectively. In addition, the polymer membranes prior to cycling showed peaks at 509, 570, 684, 762, 1229, 1355, 2829 and 2960 corresponding to out of plane —C—C— bending of the ring structure of dioxolane, symmetric deformation mode of —CF$_3$ group from interaction with dioxolane, —N—H bending vibrations from the imide group of LiTFSI, —C═O vibrations (ester), —C—N— stretching vibration, —CH$_3$ vibration from dimethoxyethane, —CH$_2$ symmetric stretching vibrations and —C—H stretching vibrations, respectively.

After 100 charge-discharge cycles, both sides of the polymer membrane showed almost the same pattern with peaks at 3680-3130 cm$^{-1}$ indicating the presence of exchangeable protons, from amide group of LITFSI. The peaks at 1630 and 1500 cm$^{-1}$ corresponded to —C═O bond from carbonyl group of dimethoxyethane. The band around 1333 cm$^{-1}$ corresponded to the —C—H ring bending vibrations of dioxolane ring. The peak at 1134 cm$^{-1}$ corresponded to stretching vibrations of carbonate group. The peaks at 1008, 793, 683 cm$^{-1}$ corresponded to —Si—O stretching vibrations, —SO$_3$ group from LiTFSI and Si—O—Si stretching vibration modes, respectively. The absence of anomalous peaks confirmed the chemical stability of the polymer membranes even after prolonged cycling. The chemical stability of the CPEs suggested their potential to replace PP separators in commercial sulfur batteries.

Lithium Symmetric Cell Performance

Figure 9:
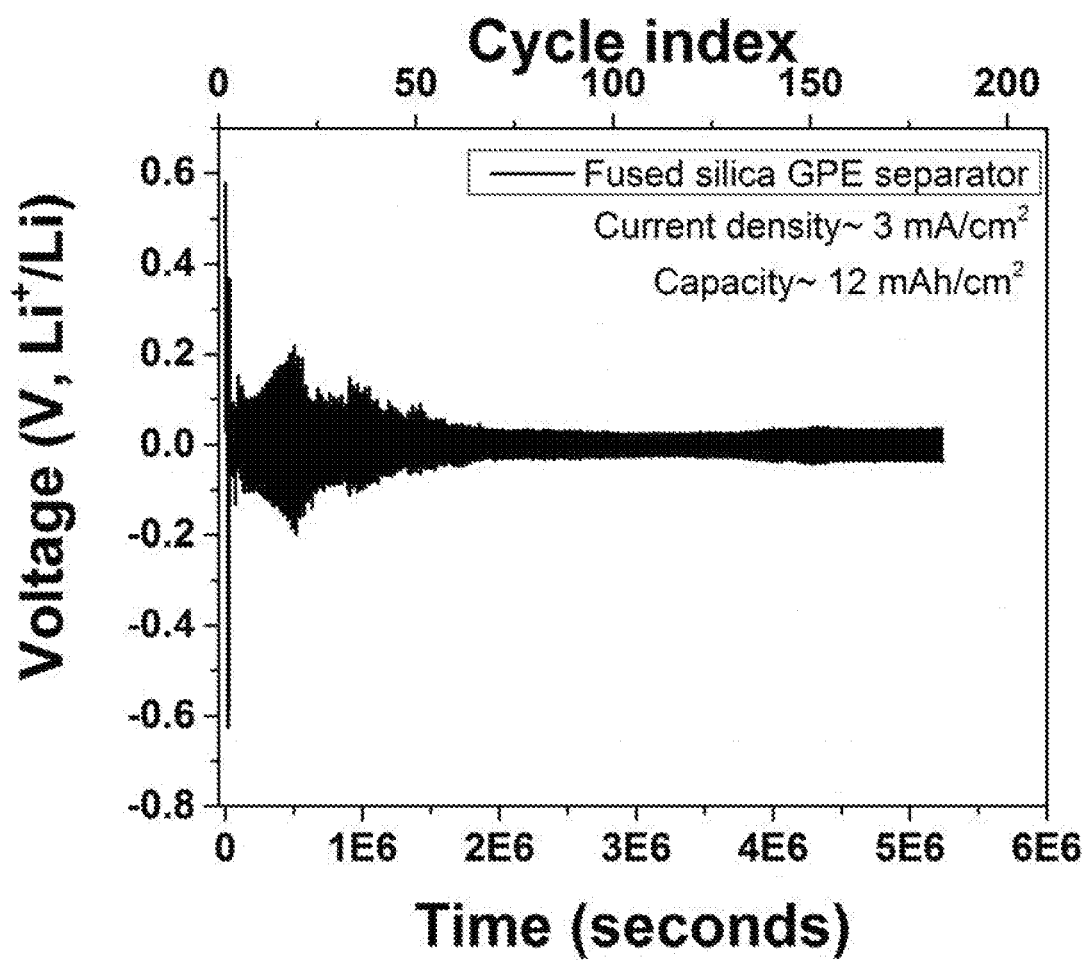
FIG. 9 shows stable cycling behavior demonstrated in lithium symmetric-cells using f-$SiO_2$ separators, in accordance with certain embodiments of the invention.

Lithium-lithium symmetric cells were prepared using f-SiO$_2$ containing PVdF-HFP GPEs as the separator. In order to demonstrate that the superior mechanical properties observed in FIG. 4 and the superior ionic conductivity observed in Table 3 contribute to the superior lithium-metal anode performance, testing was performed by plating and deplating a constant amount of lithium at a high current density of ~3 mAicm$^2$ (which is known to result in dendritic failure in commercial separator based lithium metal anode cells). Lithium plating-deplating is known to cause an increase in overpotential during cycling as a result of dendritic structure formation and a resulting formation-reformation of solid-electrolyte interphase (SEI). Control cells using liquid electrolyte failed during initial cycling as a result of rapid increase in overpotential. In contrast, f-SiO$_2$ based cells demonstrate very good stability over >150 cycles as seen in FIG. 9. The superior mechanical properties yielded by the fine nanoparticles in the f-SiO$_2$ separator result in this unique performance demonstrating that such CPEs are suitable not only to address polysulfide dissolution but to address as well as the prevention of dendritic growth in lithium metal anode based Li—S batteries.

Example 2

Figure 10:
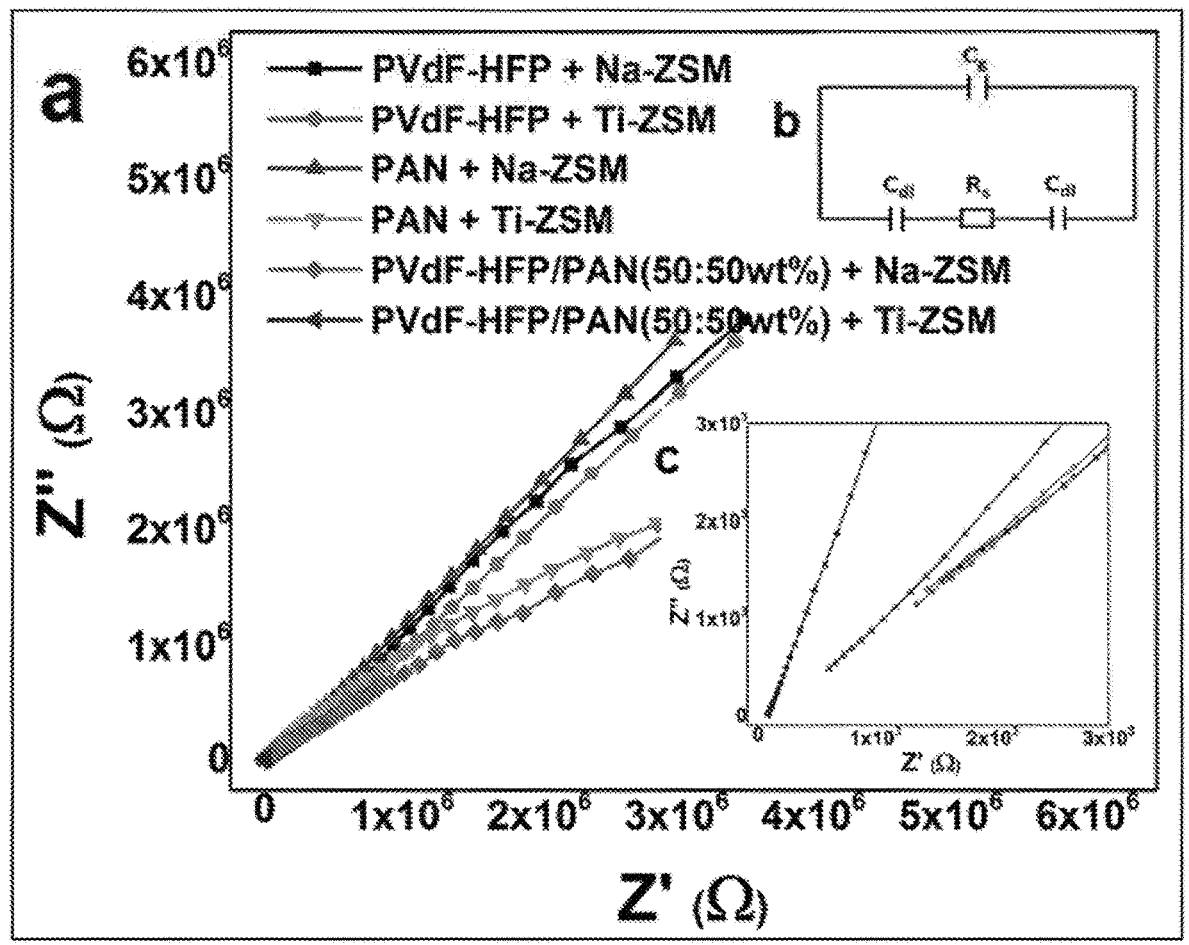
FIG. 10 shows fitted Nyquist plot of the polymer membranes, enlarged Nyquist plot and equivalent circuit used to fit the Nyquist plots, in accordance with certain embodiments of the invention.
Figure 14:
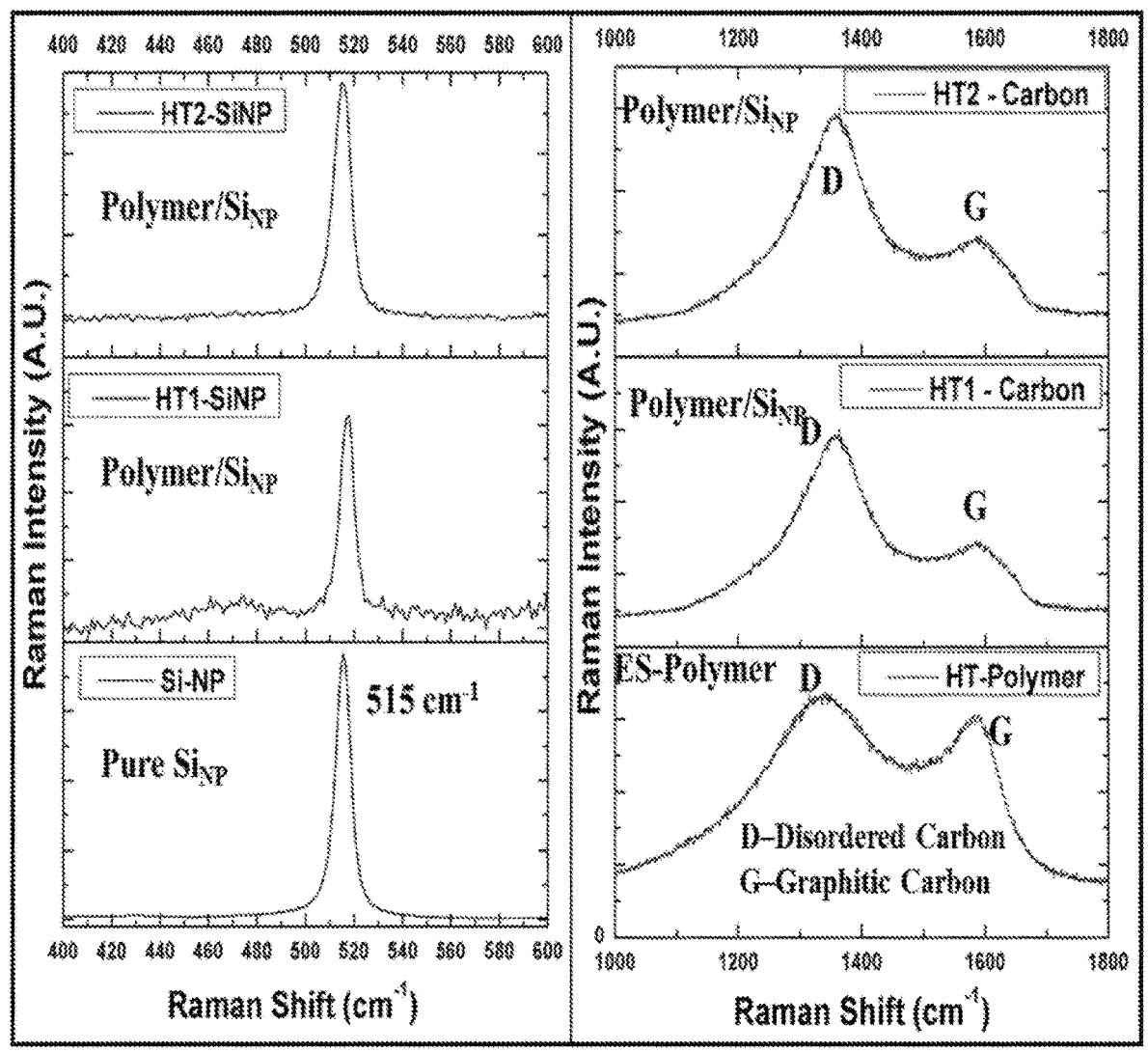
FIG. 14 shows Raman spectra of flexible silicon-based system at different stages of processing and heat treatment, in accordance with certain embodiments of the invention.

Development of ZSM Nanofiller CPEs
Ionic Conductivity Data of ZSM Nanofiller CPEs The room temperature Li-ion conductivity of CPES should be closer to liquid electrolytes to display better electrochemical properties for potential applications in Li-ion batteries. EIS analysis of the CPEs was performed using stainless steel blocking electrodes on both sides. Nyquist plot of the EIS analysis of CPEs are shown in FIG. 10a, c. The impedance plots were modeled to the general equivalent circuit using Z-view 2.0, shown in FIG. 14b, where $R_s$ represents the electrolyte resistance, $C_{dl}$ represents the capacitive coupling between the ionic conduction in the electrolyte and the electronic conduction in the measuring circuit. Additionally, $C_g$ is the geometrical capacitance representing the capacitive effects of the cell hardware and of the electrical leads. The electrolyte conductivity was thus, calculated using $R_s$, thickness of the polymer membrane (t) and the surface are of the electrolyte sample, A using the equation given below:

$$\sigma = \frac{t}{R_s A}$$

The room temperature conductivities of the polymer electrolytes are about ~$10^{-3}$ S cm$^{-1}$ which is in line with several reports. From the conductivity value of the electrolyte, it is seen that there is an increase in ionic conductivity of the CPE systems in comparison with the liquid electrolyte-based separator. This is due to the enhanced electrolyte uptake due to the nanoporous structure of the electrospun membranes. PVdF-HFP/PAN (50:50 wt %) membranes with Ti-ZSM fillers shows the highest room temperature conductivity of 4.829×10$^{-1}$ S cm$^{-1}$ (Table 4).

TABLE 4

Ionic conductivity of commercial electrolyte and various polymer membrane electrolytes. Each data represents an average of three independent tests run on three different samples under identical conditions

| LIC Composition | Ionic Conductivity (mS cm$^{-1}$) |
| --- | --- |
| PVdF-HFP + Na-ZSM | 1.351 |
| PVdF-HFP + Ti-ZSM | 2.253 |
| PAN + Na-ZSM | 2.654 |
| PAN + Ti-ZSM | 2.997 |
| PVdF-HFP/PAN (50:50 wt %) + Na-ZSM | 2.091 |
| PVdF-HFP/PAN (50:50 wt %) + Ti-ZSM | 4.839 |
| Liquid Electrolyte | 4.283 |

Mechanical Property Data of the CPEs

Figure 11:
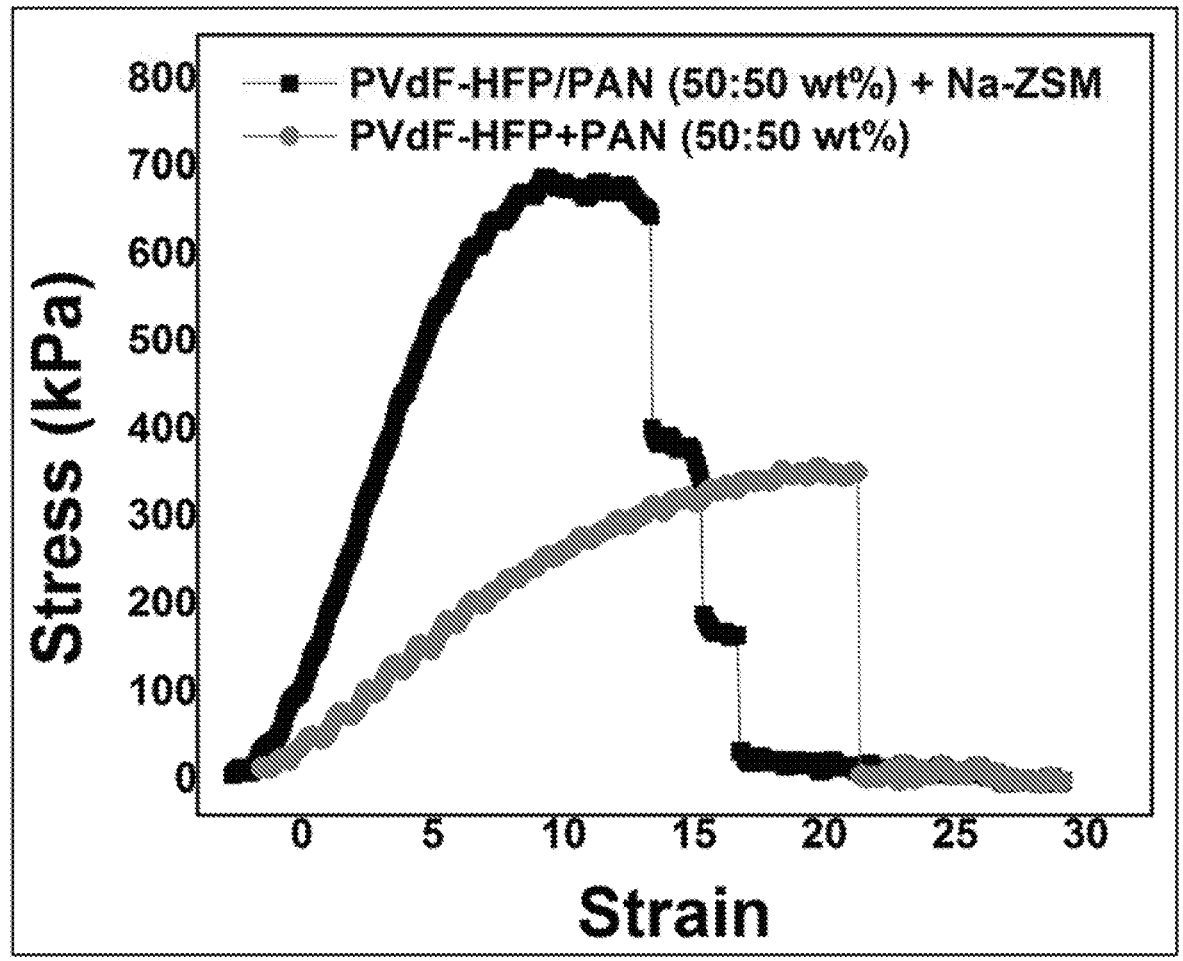
FIG. 11 is a plot that shows a stress versus strain relationship for nm-$TiO_2$ incorporated membranes, in accordance with certain embodiments of the invention.

The mechanical properties of the electrospun polymer membranes are very important for effective application in batteries as separators. In the electrospun membranes, the mechanical properties are expected to be improved due to entanglement of singular fibers aided by the presence of nanoparticle fillers. The mechanical properties of the electrospun membranes were compared to that of solution cast membranes of the same composition to demonstrate the superior properties attained by the electrospinning method. The thickness of both electrospun and solvent cast membranes used for mechanical property measurements was maintained uniformly at 0.035±0.005 mm. The Strain vs Stress and Tensile Strength of the hybrid membranes characterized by tensile measurements are represented in FIG. 11. Both the solvent cast and electrospun samples exhibited a linear elastic behavior comparable to the results from similar systems reported in literature. The failure of the electrospun PVdF-HFP/PAN (50:50 wt %)+Na-ZSM membranes is much prolonged, as seen in FIG. 11, due to the enhanced mechanical property incorporated by the Na-ZSM.

Electrochemical Cycling Performance of the CPEs

Figure 12:
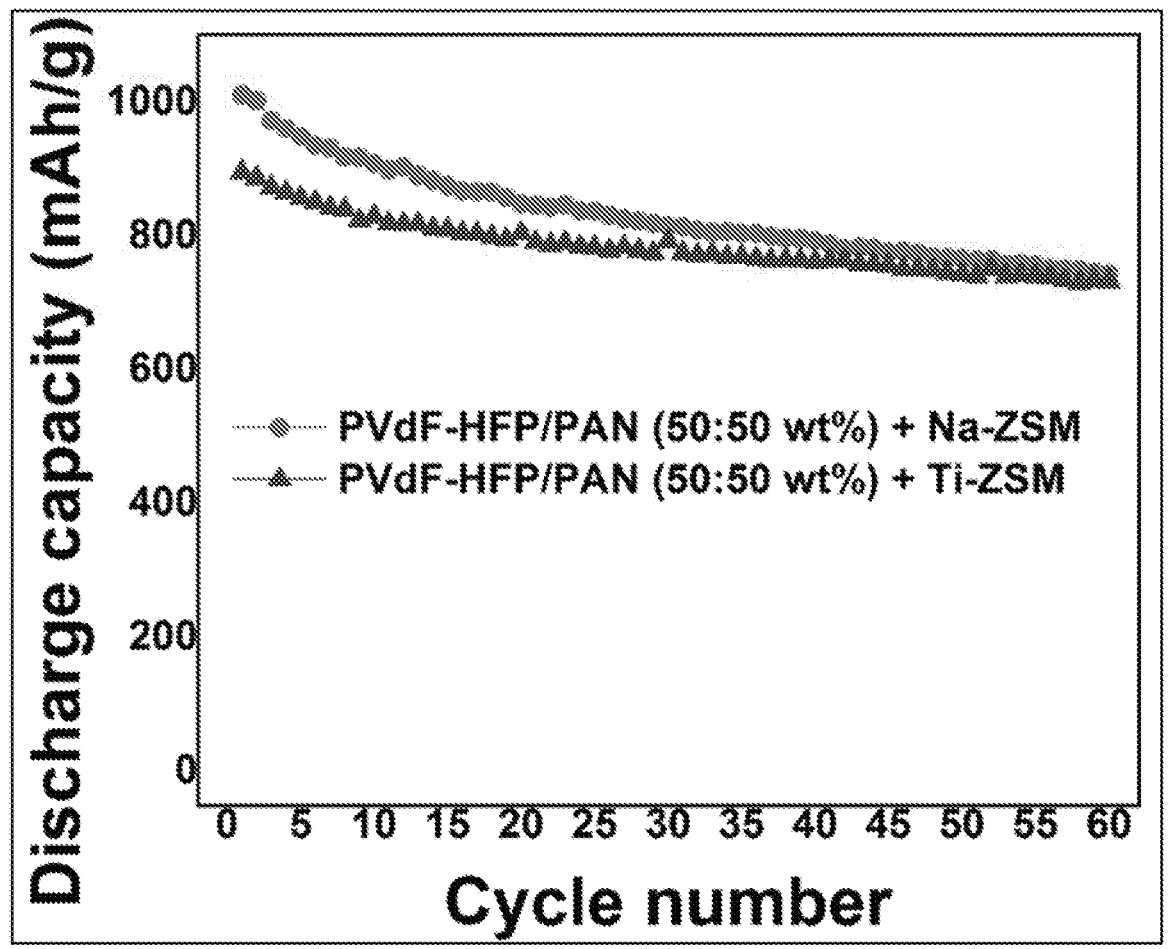
FIG. 12 is a plot that shows electrochemical cycle performance of different polymer membranes, in accordance with certain embodiments of the invention.

The electrochemical performance of the PVdF-HFP composite polymer electrolytes were studied by performing electrochemical charge—discharge cycling against commercial sulfur cathodes. The electrochemical cycling performance and coulombic efficiencies of the polymer electrolytes are shown in FIG. 12. The PVdF-HFP/PAN (50:50 wt %)+Na-ZSM hybrid polymer separator shows an initial capacity of 1010 mAh g$^{-1}$ and a stable capacity of 842 mAh g$^{-1}$ after 60 cycles. On the other hand, the PVdF-HFP/PAN (50:50 wt %)+Ti-ZSM shows an initial discharge capacity of 894 mAh g$^{-1}$ which stabilizes at 820 mAh g$^{-1}$ after the 60 cycles.

Development of Si-Based Flexible Systems

Figure 13:
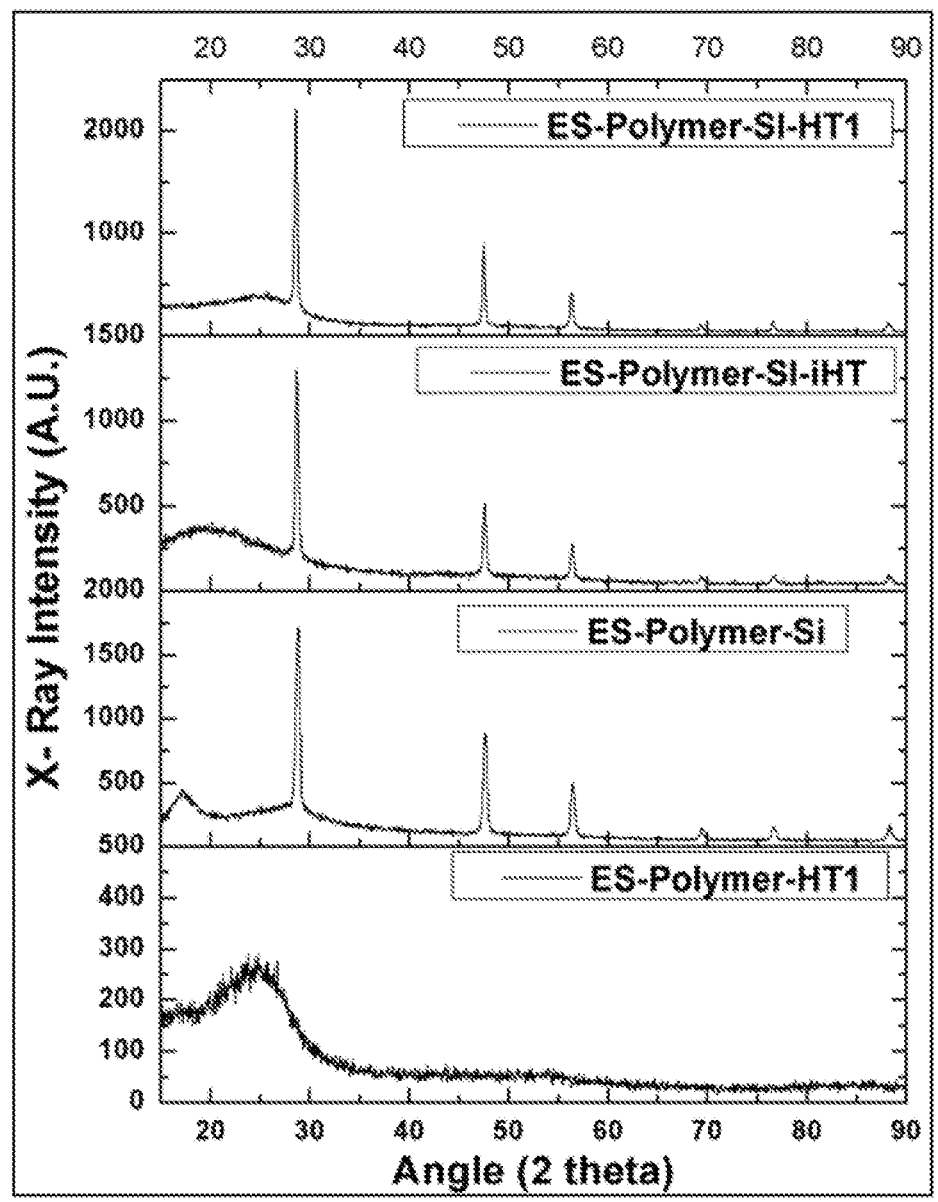
FIG. 13 is a plot showing x-ray diffraction pattern for flexible silicon-based system at different stages of processing, in accordance with certain embodiments of the invention.

The X-Ray diffraction pattern (FIG. 13) of the system shows a broad peak indicating the amorphous nature of the ES-Polymer-HT1. The use of composite solution produces ES-Polymer-Si with two distinct phases of polymer and Si as observed by the broad peak and sharp peaks (dominant peak at 2θ~28°) in the XRD pattern. Subsequently, the composite structure is retained even after employing the heat treatment schedule without any reaction between the components of the system.

The Raman spectra (FIG. 14) of the system shows a peak at ~510-515 cm$^{-1}$ indicating the nano crystalline nature of Si in the flexible system and the evolution of graphitic carbon bands on employing different heat treatment schedule during the processing of the system. The increase in the graphitic carbon intensity indicates the improvement in the conductivity and determines the mechanical properties and flexibility of the system.

Figure 15:
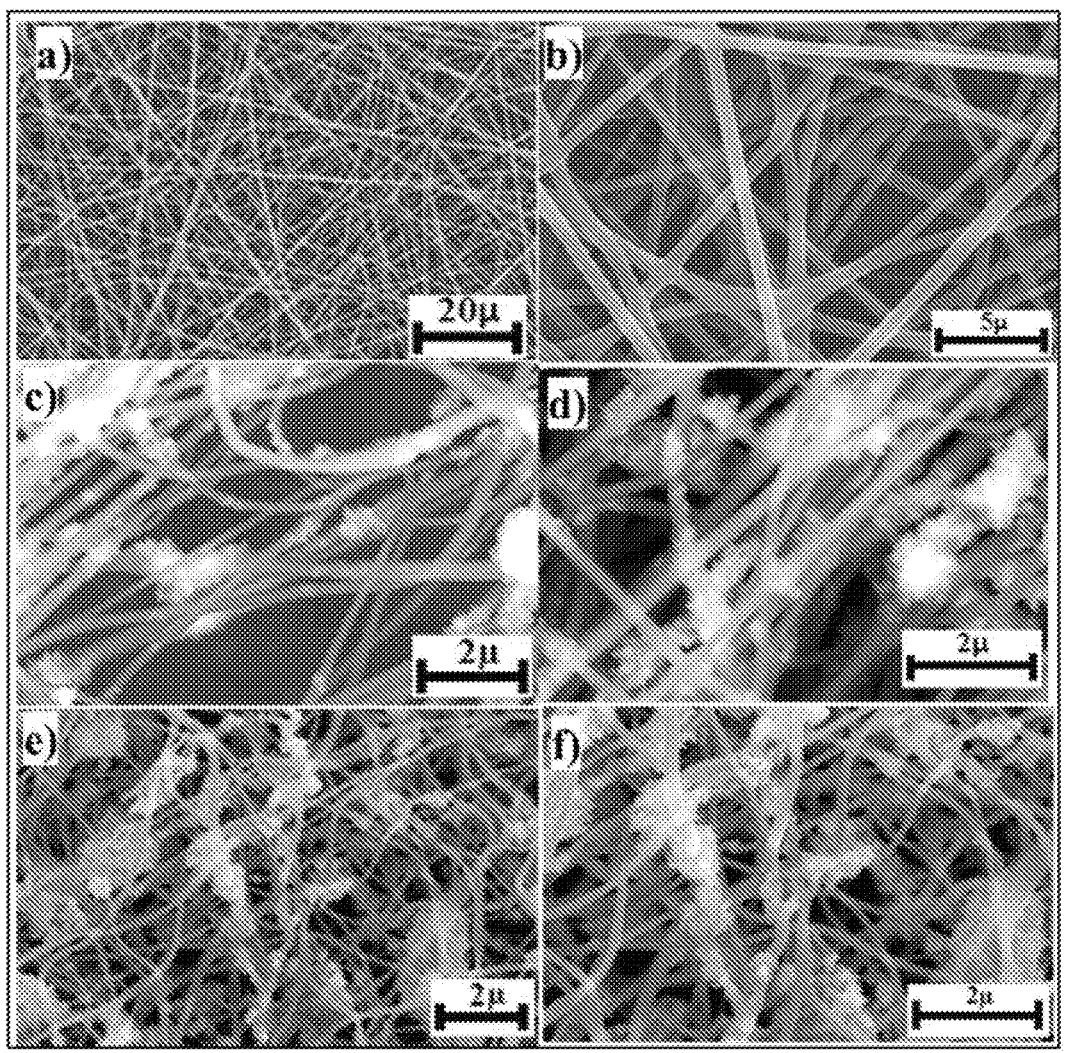
FIG. 15 shows low and high magnification scanning electron microscopy of various anode systems, in accordance with certain embodiments of the invention.

The scanning electron microscopy of the polymer system (FIG. 15a, b) shows interconnected polymer network with diameters varying from ~400-600 nm while that of composite system (FIG. 15c, d) shows silicon embedded in these polymer networks. Further processing of these composite systems leads to the shrinkage of the network to ~100-300 nm diameters (FIG. 15e, f) without any damage to the interconnected network and Si still embedded in the system. Hence, the interconnected composite network is retained in both undecomposed and decomposed composite polymer based electrode system.

Figure 16:
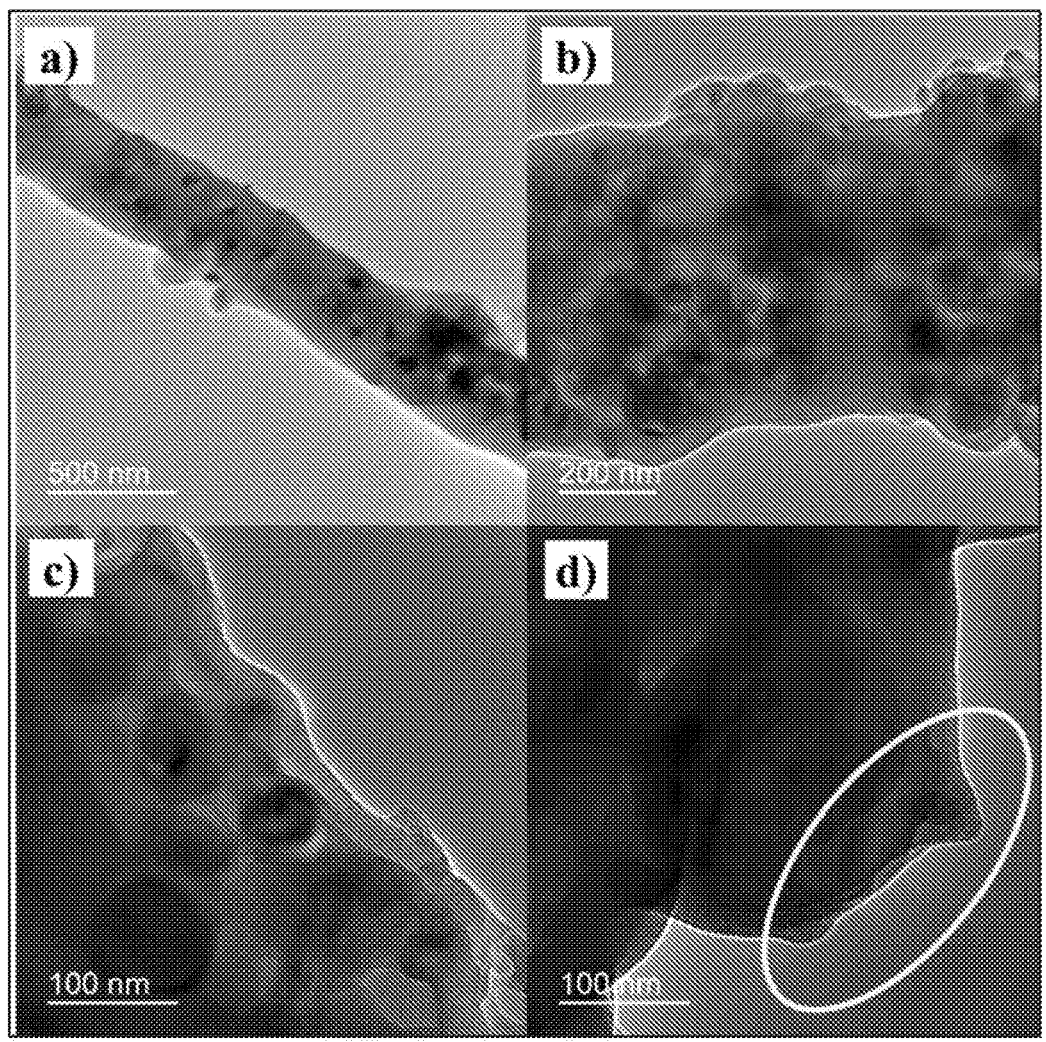
FIG. 16 shows low and high magnification transmission electron microscopy of silicon-based flexible anode system after heat treatment, in accordance with certain embodiments of the invention.

The transmission electron microscopy conducted on the system shows Si well distributed uniformly through-out the interconnected network (FIG. 16a) with the Si particles located both in the interior (FIG. 16b) and exterior (FIG. 16c) of these network strands. High magnification TEM images (FIG. 16d) show the encapsulation of the Si particles on the exterior surface by a thin layer of decomposed polymer (indicated by yellow circle).

Figure 17:
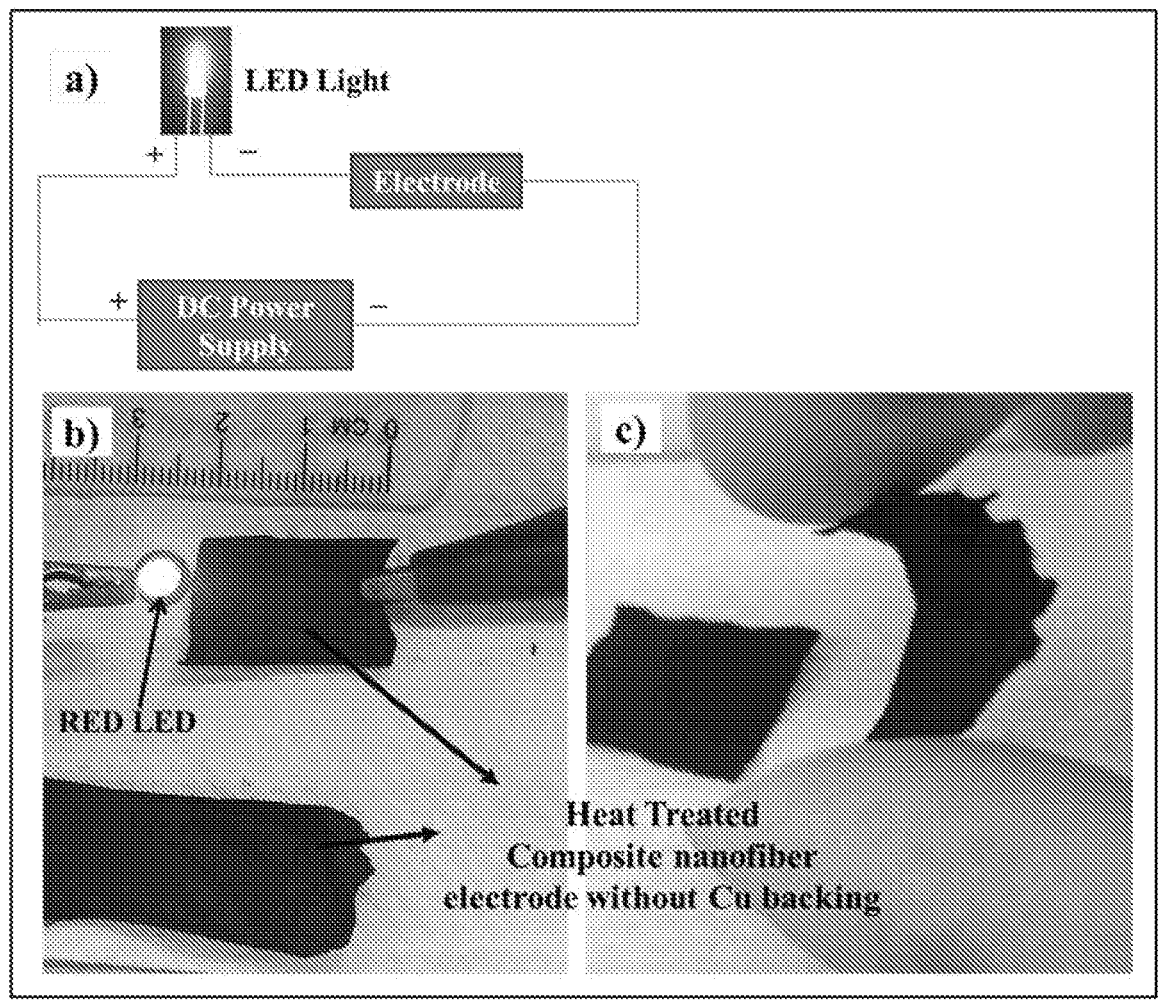
FIG. 17 shows a schematic of a circuit and an LED light test to demonstrate electrical continuity of a fabricated electrode.

The interconnected composite system was tested using a simple electrical circuit (FIG. 17a) which employed a DC power supply (~3V) to power an LED light across the Si based flexible electrode to complete the circuit. The long range electrical continuity of the electrode was confirmed by the light up of the LED (FIG. 17b) upon applying 3 VDC power supply across the terminals of the LED with the current flowing across 20 mm-40 mm length of the flexible electrode. Furthermore, the system is entirely flexible without failure or loss of contact as can be seen in FIG. 17c.

We claim:

1. A flexible energy storage system, comprising:
   an electro-spun, stacked assembly that comprises:
      a woven, flexible cathode mat in the form of a first electrospun sheet having a thickness from about 1 to about 6 microns, comprising:
         electrospun sulfur wires, each having a diameter from greater than
         about 100 nanometers to about 10 μm and a length from about 12
         inches to about 24 inches; and
         a lithium conducting polymer;
      a woven flexible anode fiber mat in the form of a second electrospun sheet having a thickness from about 300 to about 500 microns, comprising:
         a composite of electro-spun fibers, comprising:
            about 45 to about 80% by weight of a silicon component; and
            a polymer component;
      a woven, flexible, lithium ion conducting gel-polymer electrolyte separator in the form of a third electrospun sheet, comprising:
         an electrolyte fiber mat having a thickness from about 100 to about 500 microns, comprising:
            multiple layers of electrospun nanofibers, comprising:
               a lithium-containing solid or liquid electrolyte;
               an electrospun PVdF-HFP polymer matrix; and
               a filler comprising fumed silica; and
         an activation solution comprising lithium sulfur liquid electrolyte effective to activate the electrolyte fiber mat,
      wherein each of the first, second and third electrospun sheets are woven together to form the flexible energy storage system.

2. The system of claim 1, wherein the electrospun sulfur wires are in the form of an electrospun yarn.

3. The system of claim 1, wherein the electrospun, stacked assembly comprises:
   an anode current collector;
   the flexible anode fiber mat;
   the gel-polymer electrolyte separator;
   the flexible cathode mat; and
   a cathode current collector.

4. The system of claim 3, further comprising a polymer shell to encompass the electrospun, stacked assembly.

5. The system of claim 1, wherein the silicon component of the flexible anode fiber mat comprises one or more silicon selected from the group consisting of amorphous silicon, crystalline silicon, and nanocrystalline silicon.

6. The system of claim 5, wherein the silicon component comprises a dopant selected from any element other than Group IV of the Periodic Table.

7. The system of claim 1, wherein the electrospun sulfur wires of the flexible cathode mat are undoped and/or doped.

8. The system of claim 7, wherein the doped sulfur wires comprise a dopant selected from any element other than oxygen from Group VI of the Periodic Table.

9. A flexible battery device, comprising:
   a stacked configuration, comprising:
      a flexible anode fiber mat in the form of a second electrospun sheet having a thickness from about 300 to about 500 microns, comprising:
         a composite of electro-spun fibers, comprising:
            about 45 to about 80% by weight of a silicon component; and
            a polymer component;
      a flexible cathode mat in the form of a first electrospun sheet having a thickness from about 1 to about 6 microns, comprising:
         electrospun sulfur wires, each having a diameter from greater than
         about 100 nanometers to about 10 μm and a length from about 12
         inches to about 24 inches; and
         a lithium conducting polymer; and
      a flexible lithium ion conducting gel-polymer electrolyte separator in the form of a third electrospun sheet, comprising:
         electrolyte fiber mat having a thickness from about 100 to about 500 microns, comprising:
            multiple layers of electro-spun nanofibers, comprising:
               a lithium-containing solid or liquid electrolyte;
               an electrospun PVdF-HFP polymer matrix; and
               a filler comprising fumed silica; and
      an activation solution comprising lithium sulfur liquid electrolyte effective to activate the electrolyte fiber mat,
      wherein each of the first, second and third electrospun sheets are woven together to form the flexible energy storage system.

10. A method of preparing a flexible energy storage system, comprising:
    electrospinning about 45 to about 80% by weight of a silicon component and a polymer component to produce composite electrospun silicon fibers in a form of a flexible anode fiber mat in the form of a second electrospun sheet having a thickness from about 300 to about 500 microns;
    electrospinning a sulfur component to produce electrospun sulfur wires and combining with a lithium conducting polymer to form a flexible cathode mat in the form of a first electrospun sheet having a thickness from about 1 to about 6 microns, wherein the electrospun sulfur wires, each have a diameter from greater than about 100 nanometers to about 10 μm and a length from about 12 inches to about 24 inches;

forming a flexible, lithium ion conducting gel-polymer electrolyte separator in the form of a third electrospun sheet, comprising:
- an electrolyte fiber mat having a thickness from about 100 to about 500 microns, comprising:
  - multiple layers of electro-spun nanofibers, comprising:
    - a lithium-containing solid or liquid electrolyte;
    - an electrospun PVdF-HFP polymer matrix; and
    - a filler comprising fumed silica;
- soaking the electrolyte fiber mat in an activation solution comprising lithium sulfur liquid electrolyte to activate the electrolyte fiber mat; and
- assembling the anode, cathode, and electrolyte to form a stacked assembly, wherein each of the first, second and third electrospun sheets are woven together.

11. The method of claim 10, wherein the electrospun sulfur wires are in a form of electro-spun yarn.

12. A textile fabric having integrated therein the flexible energy storage system of claim 1.

13. The flexible energy storage system of claim 1, wherein the cathode mat comprises alternating layers of the sulfur wires and the conducting polymer deposited onto a current collector.

14. The flexible energy storage system of claim 9, wherein the cathode mat comprises alternating layers of the sulfur wires and the conducting polymer deposited onto a current collector.

15. A textile fabric having integrated therein the flexible energy storage system of claim 9.

16. The flexible energy storage system of claim 1, wherein the filler comprises 10% by weight of the electrolyte fiber mat.

17. The flexible battery device of claim 9, wherein the filler comprises 10% by weight of the electrolyte fiber mat.

18. The method of claim 10, wherein the filler comprises 10% by weight of the electrolyte fiber mat.

* * * * *